(12) United States Patent
Kim et al.

(10) Patent No.: US 10,665,175 B2
(45) Date of Patent: May 26, 2020

(54) DISPLAY DEVICE HAVING A PLURALITY OF PIXEL REGIONS THAT INCLUDE DRIVING TRANSISTORS EACH OF WHICH INITIALIZED WITH A VOLTAGE THAT DEPENDS UPON THE DISPLAY MODE, AND DRIVING METHOD THEREOF

(71) Applicant: Samsung Display Co., Ltd., Yongin-si, Gyeonggi-do (KR)

(72) Inventors: Tae Hoon Kim, Yongin-si (KR); Ji Hyun Ka, Yongin-si (KR); Hwan Soo Jang, Yongin-si (KR); Jin Tae Jeong, Yongin-si (KR); Min Woo Byun, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 175 days.

(21) Appl. No.: 15/845,907

(22) Filed: Dec. 18, 2017

(65) Prior Publication Data

US 2018/0174525 A1 Jun. 21, 2018

(30) Foreign Application Priority Data

Dec. 19, 2016 (KR) ........................ 10-2016-0173876

(51) Int. Cl.
*G06F 3/038* (2013.01)
*G09F 5/00* (2006.01)
(Continued)

(52) U.S. Cl.
CPC ......... *G09G 3/3291* (2013.01); *G09G 3/3266* (2013.01); *G09G 3/3283* (2013.01);
(Continued)

(58) Field of Classification Search
None
See application file for complete search history.

(56) References Cited

U.S. PATENT DOCUMENTS 8,089,446 B2 1/2012 Pak et al.
8,514,163 B2 8/2013 Pak et al.
(Continued)

FOREIGN PATENT DOCUMENTS

KR 10-1272337 B1 6/2013
KR 10-1294016 B1 8/2013

*Primary Examiner* — Lunyi Lao
*Assistant Examiner* — Kirk W Hermann
(74) *Attorney, Agent, or Firm* — Lewis Roca Rothgerber Christie LLP

(57) ABSTRACT

A display device includes: a first pixel region including first pixels, each of the first pixels including a driving transistor to be initialized by a first initialization power source supplied from a first power line; a second pixel region including second pixels, each of the second pixels including a driving transistor to be initialized by a second initialization power source supplied from a second power line; and a power supplier to supply the first initialization power source and the second initialization power source, the first initialization power source and the second initialization power source having a same voltage level when the display device is driven in a first mode, and the first initialization power source and the second initialization power source having different voltage levels during at least one frame period when the display device is driven in a second mode.

32 Claims, 29 Drawing Sheets

(51) Int. Cl.
*G09G 3/3291* (2016.01)
*G09G 3/3283* (2016.01)
*G09G 3/3266* (2016.01)

(52) U.S. Cl.
CPC ............... *G09G 2300/0426* (2013.01); *G09G 2300/0819* (2013.01); *G09G 2310/0216* (2013.01); *G09G 2310/0221* (2013.01); *G09G 2320/02* (2013.01); *G09G 2320/0233* (2013.01); *G09G 2330/02* (2013.01); *G09G 2330/021* (2013.01)

(56) References Cited

U.S. PATENT DOCUMENTS

2003/0103022 A1* 6/2003 Noguchi .............. G09G 3/3233 345/77
2014/0028649 A1* 1/2014 Kim ..................... G09G 3/3233 345/212
2014/0028859 A1* 1/2014 Kim ......................... G09G 3/30 348/189
2015/0009194 A1* 1/2015 Kim ..................... G09G 3/3233 345/211
2015/0364092 A1* 12/2015 Kim ..................... G09G 3/3233 345/205
2017/0287396 A1* 10/2017 Akimoto .............. G09G 3/3233
2018/0075804 A1* 3/2018 Kim ..................... G09G 3/3233

* cited by examiner

DISPLAY DEVICE HAVING A PLURALITY OF PIXEL REGIONS THAT INCLUDE DRIVING TRANSISTORS EACH OF WHICH INITIALIZED WITH A VOLTAGE THAT DEPENDS UPON THE DISPLAY MODE, AND DRIVING METHOD THEREOF

CROSS-REFERENCE TO RELATED APPLICATION

This application claims priority to and the benefit of Korean Patent Application No. 10-2016-0173876, filed on Dec. 19, 2016, in the Korean Intellectual Property Office, the entire disclosure of which is incorporated by reference herein.

BACKGROUND

1. Field

One or more aspects of example embodiments of the present disclosure relate to a display device and a driving method thereof.

2. Description of the Related Art

Recently, various types of electronic devices that are directly wearable on a body of a user have been developed. These devices are generally referred to as a wearable electronic device (or a wearable device).

In particular, as an example of the wearable electronic device, a head mounted display device (hereinafter, referred to as "HMD") displays a realistic image, and hence, provides a high-degree of immersion. Accordingly, the HMD has various usages, for example, viewing a movie.

SUMMARY

One or more aspects of example embodiments are directed toward a display device capable of improving display quality, and a driving method of the display device.

According to an aspect of the present disclosure, a display device includes: a first pixel region including first pixels, each of the first pixels including a driving transistor configured to be initialized by a first initialization power source supplied from a first power line; a second pixel region including second pixels, each of the second pixels including a driving transistor configured to be initialized by a second initialization power source supplied from a second power line; and a power supplier configured to supply the first initialization power source and the second initialization power source, the first initialization power source having the same voltage level as that of the second initialization power source when the display device is driven in a first mode, and the first initialization power source having a different voltage level from that of the second initialization power source during at least one frame period when the display device is driven in a second mode.

The display device may be configured to be driven in the second mode when the display device is mounted on a wearable device, and the display device may be configured to be driven in the first mode otherwise.

The power supplier may be configured to supply each of the first initialization power source and the second initialization power source, each having a second voltage, when the display device is driven in the first mode.

The power supplier may be configured to: supply the second initialization power source having the second voltage, when the display device is driven in the second mode; and supply the first initialization power source having a first voltage that is higher than the second voltage, when the display device is driven in the second mode.

The power supplier may be configured to: supply the second initialization power source having the second voltage, when the display device is driven in the second mode; supply the first initialization power source having a first voltage that may be higher than the second voltage during a first frame period, when the display device is driven in the second mode; and supply the first initialization power source having a fourth voltage that may be lower than the second voltage during a second frame period adjacent to the first frame period, when the display device is driven in the second mode.

The fourth voltage may have the same voltage level as that of the second voltage.

The first power line and the second power line may be at one side of the first pixel region and the second pixel region.

The first power line and the second power line may be each at two opposite sides of the first pixel region and the second pixel region.

Each of the first pixels and the second pixels may further include: an organic light emitting diode, and the driving transistor may be configured to control an amount of current supplied to the organic light emitting diode. The power supplier may be configured to supply the first initialization power source and/or the second initialization power source before a data signal is supplied to a gate electrode of the driving transistor.

A voltage of the first initialization power source may be supplied to an anode electrode of the organic light emitting diode of each of the first pixels before the organic light emitting diode emits light, and a voltage of the second initialization power source may be supplied to an anode electrode of the organic light emitting diode of each of the second pixels before the organic light emitting diode emits light.

A voltage of a third initialization power source may be supplied to an anode electrode of the organic light emitting diode of each of the first pixels and the second pixels via a third power line before the organic light emitting diode emits light.

The third initialization power source may have a voltage level different from each of the first initialization power source and the second initialization power source.

The third initialization power source may have a voltage level lower than each of the first initialization power source and the second initialization power source.

The power supplier may be configured to supply the third initialization power source having the same voltage level when the display device is driven in the first mode and the second mode.

The third power line may be at one side of the first pixel region and the second pixel region.

The third power line may be at two opposite sides of each of the first pixel region and the second pixel region.

The display device may further include: a first scan driver configured to drive first scan lines coupled to the first pixels; a first emission driver configured to drive first emission control lines coupled to the first pixels; a second scan driver configured to drive second scan lines coupled to the second pixels; and a second emission driver configured to drive second emission control lines coupled to the second pixels.

The first scan driver may be configured to supply a scan signal to the first scan lines, and the first emission driver may be configured to supply an emission control signal to the first emission control lines such that the first pixels emit light corresponding to a data signal, when the display device is driven in the first mode.

The first scan driver may be configured to supply a gate-off voltage to the first scan lines, and the first emission driver may be configured to supply a gate-off voltage to the first emission control lines, when the display device is driven in the second mode.

The second scan driver may be configured to supply a scan signal to the second scan lines, and the second emission driver may be configured to supply an emission control signal to the second emission control lines such that the second pixels emit light corresponding to a data signal, when the display device is driven in each of the first mode and the second mode.

The display device may further include a third pixel region including third pixels, each of the third pixels including a driving transistor configured to be initialized by the first initialization power source.

The first initialization power source may be supplied to the third pixels via the first power line.

The first initialization power source may be supplied to the third pixels via a fourth power line different from the first power line.

The second pixel region may be between the first pixel region and the third pixel region.

Each of the first pixels, the second pixels, and the third pixels may include: an organic light emitting diode, and the driving transistor may be configured to control an amount of current supplied to the organic light emitting diode. The power supplier may be configured to supply the first initialization power source and/or the second initialization power source to a gate electrode of the driving transistor before a data signal is supplied.

A voltage of the first initialization power source may be supplied to an anode electrode of the organic light emitting diode of each of the first pixels and the third pixels before the organic light emitting diode emits light, and a voltage of the second initialization power source may be supplied to an anode electrode of the organic light emitting diode of each of the second pixels before the organic light emitting diode emits light.

A voltage of a third initialization power source may be supplied to an anode electrode of the organic light emitting diode of each of the first pixels, the second pixels, and the third pixels via a third power line before the organic light emitting diode emits light.

The third initialization power source may have a voltage level different from each of the first initialization power source and the second initialization power source.

The power supplier may be configured to supply the third initialization power source having the same voltage level when the display device is driven in each of the first mode and the second mode.

The display device may further include: a first scan driver configured to drive first scan lines coupled to the first pixels; a first emission driver configured to drive first emission control lines coupled to the first pixels; a second scan driver configured to drive second scan lines coupled to the second pixels; a second emission driver configured to drive second emission control lines coupled to the second pixels; a third scan driver configured to drive third scan lines coupled to the third pixels; and a third emission driver configured to drive third emission control lines coupled to the third pixels.

The first scan driver may be configured to supply a scan signal to the first scan lines, and the third scan driver may be configured to supply a scan signal to the third scan lines, when the display device is driven in the first mode; and The first emission driver may be configured to supply an emission control signal to the first emission control lines such that the first pixels emit light corresponding to a data signal, and the third emission driver may be configured to supply an emission control signal to the third emission control lines such that the third pixels emit light corresponding to the data signal, when the display device is driven in the first mode.

The first scan driver may be configured to supply a gate-off voltage to the first scan lines, and the third scan driver may be configured to supply a gate-off voltage to the third scan lines, when the display device is driven in the second mode; and the first emission driver may be configured to supply a gate-off voltage to the first emission control lines, and the third emission driver may be configured to supply a gate-off voltage to the third emission control lines, when the display device is driven in the second mode.

The second scan driver may be configured to supply a scan signal to the second scan lines, and the second emission driver may be configured to supply an emission control signal to the second emission control lines such that the second pixels emit light corresponding to a data signal, when the display device is driven in each of the first mode and the second mode.

According to an aspect of the present disclosure, a method for driving a display device is provided, the method including: supplying initialization power sources having the same voltage level to first pixels included in a first pixel region and second pixels included in a second pixel region, when the display device is driven in a first mode; and supplying the initialization power sources having different voltage levels to the first pixels and the second pixels, when the display device is driven in a second mode.

A corresponding one of the initialization power sources may be supplied to a gate electrode of a driving transistor of each of the first pixels and the second pixels before a data signal is supplied.

The method may further include supplying a corresponding one of the initialization power sources to an anode electrode of an organic light emitting diode of each of the first pixels and the second pixels, when the display device is driven in the first mode and the second mode.

A voltage of the corresponding initialization power source may have a voltage level different from that of each of other ones of the initialization power sources.

The voltage level of the corresponding initialization power source may be lower than that of each of the other initialization power sources.

The second pixels may display an image corresponding to a data signal when the display device is driven in each of the first mode and the second mode, and the first pixels may display an image, corresponding to the data signal, when the display device is driven in the first mode, and may be set to a non-emission state when the display device is driven in the second mode.

The first pixels may be supplied with a corresponding one of the initialization power sources having a first voltage when the display device is driven in the second mode, and the first pixels may be supplied with the corresponding one of the initialization power sources having a second voltage lower than the first voltage when the display device is driven in the first mode.

The display device may be driven in the second mode when the display device is mounted on a wearable device, and the display device may be driven in the first mode otherwise.

BRIEF DESCRIPTION OF THE DRAWINGS

The above and other aspects and features of the present disclosure will become more apparent to those skilled in the art from the following detailed description of the exemplary embodiments with reference to the accompanying drawings.

DETAILED DESCRIPTION

Figure 1A:
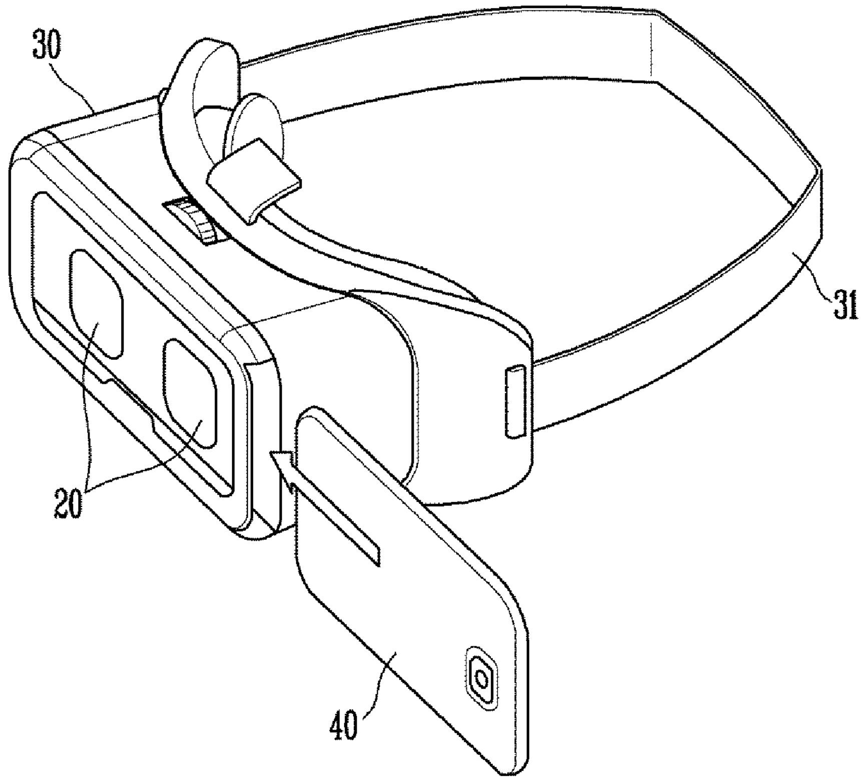
FIGS. 1A and 1B are views schematically illustrating a wearable device according to an embodiment of the present disclosure.

Hereinafter, exemplary embodiments will be described in more detail with reference to the accompanying drawings. The present disclosure, however, may be embodied in various different forms, and should not be construed as being limited to only the illustrated embodiments herein. Rather, these embodiments are provided as examples so that this disclosure will be thorough and complete, and will fully convey the aspects and features of the present disclosure to those skilled in the art. Accordingly, processes, elements, and techniques that are not necessary to those having ordinary skill in the art for a complete understanding of the aspects and features of the present disclosure may not be described. Unless otherwise noted, like reference numerals denote like elements throughout the attached drawings and the written description, and thus, descriptions thereof may not be repeated.

In the drawings, the relative sizes of elements, layers, and regions may be exaggerated and/or simplified for clarity. Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

It will be understood that when an element or layer is referred to as being "on," "connected to," or "coupled to" another element or layer, it can be directly on, connected to, or coupled to the other element or layer, or one or more intervening elements or layers may be present. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments and is not intended to be limiting of the present disclosure. As used herein, the singular forms "a" and "an" are intended to include the plural forms as well, unless the context clearly indicates otherwise. It will be further understood that the terms "comprises," "comprising," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list.

As used herein, the term "substantially," "about," and similar terms are used as terms of approximation and not as terms of degree, and are intended to account for the inherent variations in measured or calculated values that would be recognized by those of ordinary skill in the art. Further, the use of "may" when describing embodiments of the present disclosure refers to "one or more embodiments of the present disclosure." As used herein, the terms "use," "using," and "used" may be considered synonymous with the terms "utilize," "utilizing," and "utilized," respectively. Also, the term "exemplary" is intended to refer to an example or illustration.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Figure 1B:
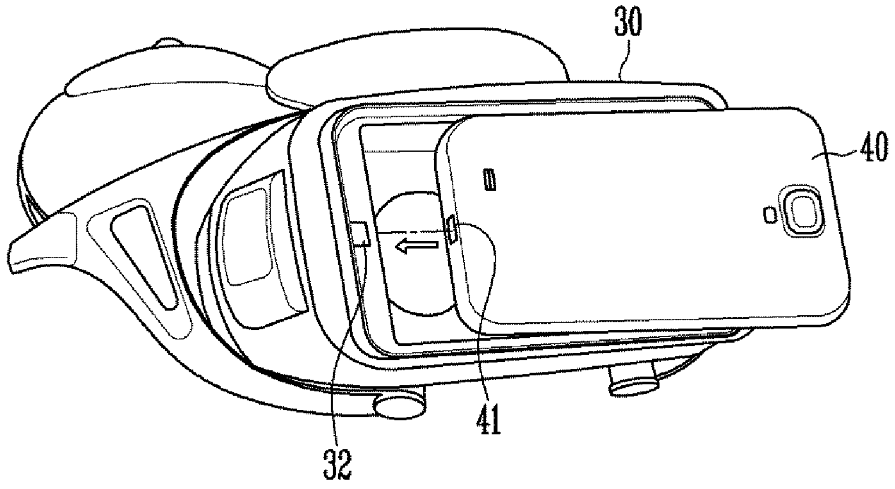

FIGS. 1A and 1B are views schematically illustrating a wearable device according to an embodiment of the present disclosure. In FIGS. 1A and 1B, an HMD is illustrated as an example of the wearable device.

Referring to FIGS. 1A and 1B, the HMD, according to an embodiment of the present disclosure, includes a body part 30.

A band 31 is connected to the body part 30. A user may wear the body part 30 on the head by using the band 31. The body part 30 has a structure in which a display device 40 may be detachably mounted thereto.

The display device 40 that is capable of being mounted in the HMD may be, for example, a smart phone. However, the display device 40 is not limited to the smart phone. For example, the display device 40 may be any suitable one of electronic devices having a display (or display means), such as a tablet PC, an electronic book reader, a personal digital assistant (PDA), a portable multimedia player (PMP), and/or a camera, for example.

When the display device 40 is mounted to the body part 30, a connection part 41 of the display device 40 is electrically coupled to a connection part 32 of the body part 30. Accordingly, communication between the body part 30 and the display device 40 may be performed. In order to control the display device 40, the HMD may include at least one of a touch panel, a button, and/or a wheel key.

If the display device 40 is mounted on the HMD, the display device 40 may be driven in a second mode. If the display device 40 is separated from the HMD, the display device 40 may be driven in a first mode. If the display device 40 is mounted on the HMD, the driving mode of the display device 40 may be automatically changed to the second mode, or be changed to the second mode by a setting of the user.

In addition, if the display device 40 is separated from the HMD, the driving mode of the display device 40 may be automatically changed to the first mode, or be changed to the first mode by a setting of the user.

The HMD includes a plurality of lenses 20 corresponding to the two eyes of the user. The lenses 20 may include fisheye lenses, wide-angle lenses, and/or the like, so as to increase the field of view of the user.

If the display device 40 is mounted on the body part 30, the user views the display device 40 via the lenses 20, and accordingly, it may be possible to provide an effect as if the user is viewing images displayed on a large-sized screen located at a certain distance therefrom.

Meanwhile, since the user views the display device 40 via the lenses 20, an effective display unit is divided into a region having a high visibility and a region having a low visibility. For example, based on both of the eyes of the user, a central region has a high visibility, and other regions may have a low visibility.

Therefore, if the display device 40 is driven in the second mode, such that the user may view more vivid images, an image is displayed at (e.g., only at) a partial region of the effective display unit. When the image is displayed at (e.g., only at) the partial region of the effective display unit, a driving frequency may be increased, and accordingly, the display device 40 may display vivid images. In addition, a gate-off voltage is supplied to signal lines (e.g., scan lines, emission control lines, etc.) located in the other regions, except the partial region of the effective display unit, and accordingly, pixels located in the other regions may be set to a non-emission state.

Figure 2:
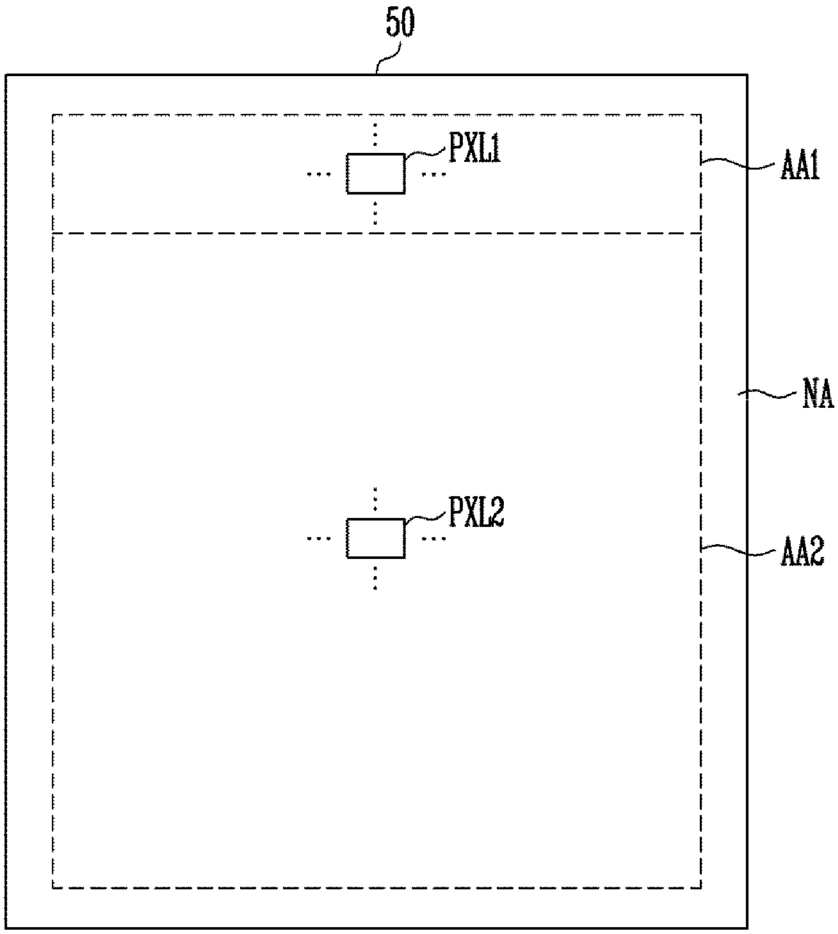
FIG. 2 is a view illustrating pixel regions of a display device according to an embodiment of the present disclosure.

FIG. 2 is a view illustrating pixel regions of a display device according to an embodiment of the present disclosure.

Referring to FIG. 2, the display device, according to an embodiment of the present disclosure, includes pixel regions AA1 and AA2 and a peripheral region NA. In this case, the pixel regions AA1 and AA2 and the peripheral region NA may be on a substrate 50.

A plurality of pixels PXL1 and PXL2 are located in the pixel regions AA1 and AA2, and accordingly, an image (e.g., a predetermined image) is displayed in the pixel regions AA1 and AA2. Therefore, the pixel regions AA1 and AA2 may be an effective display unit.

Figure 3:
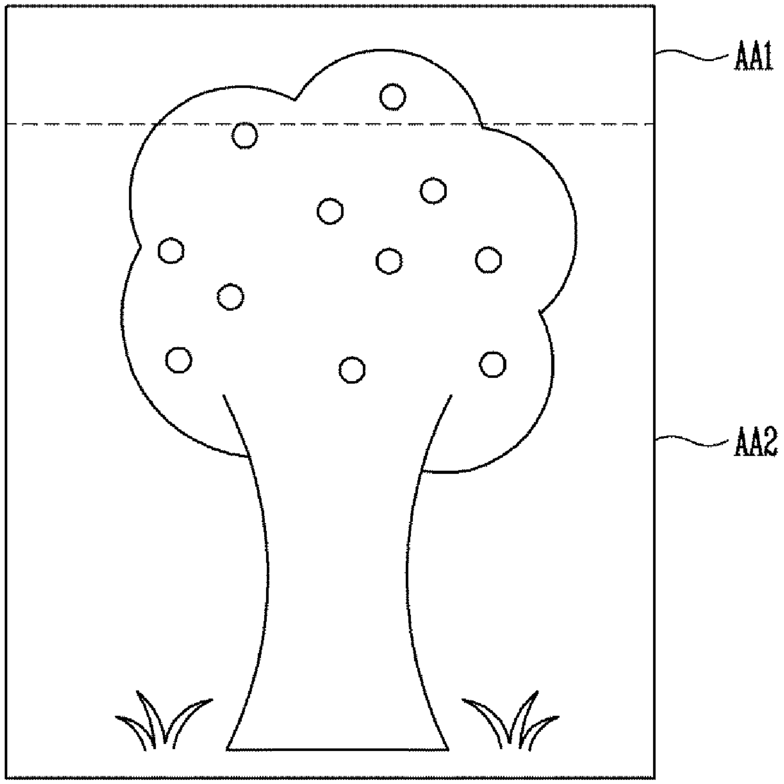
FIGS. 3 and 4 are views illustrating examples of images displayed in the pixel regions shown in FIG. 2, corresponding to various modes.

When the display device is driven in the first mode, as shown in FIG. 3, an image (e.g., a predetermined image) is displayed in a first pixel region AA1 and a second pixel region AA2.

Figure 4:
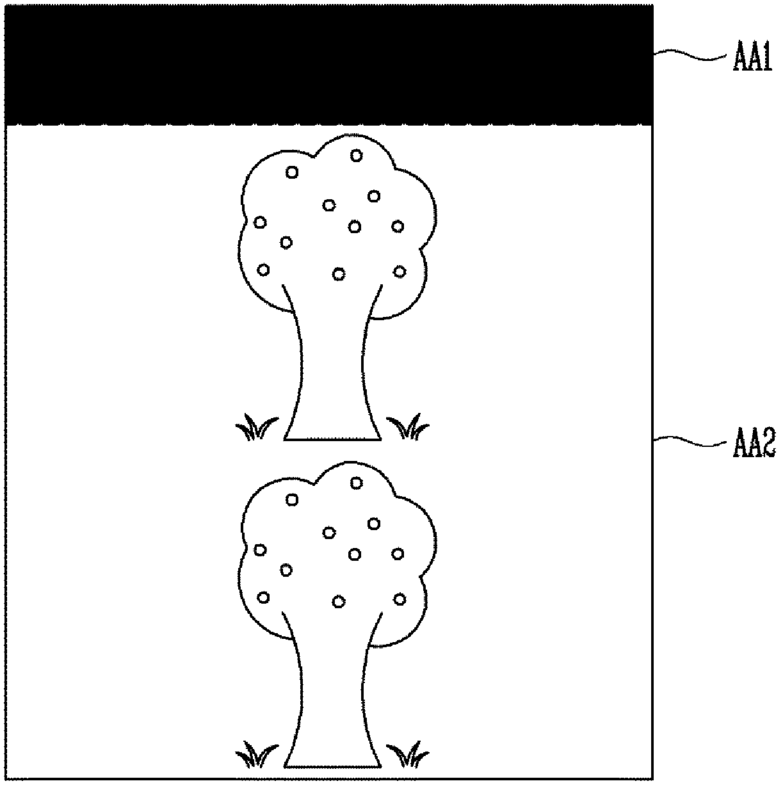

When the display device is driven in the second mode, as shown in FIG. 4, an image (e.g., a predetermined image) is displayed in the second pixel region AA2. In this case, the image displayed in the second pixel region AA2 may include two images that are the same or substantially the same to each other or different from each other corresponding to the two eyes of a user. For example, the image displayed in the second pixel region AA2 may be variously changed corresponding to characteristics of the HMD, etc.

When the display device is driven in the second mode, first pixels PXL1 included in the first pixel region AA1 may be in the non-emission state. For example, when the display device is driven in the second mode, a black screen (or a black image) may be displayed at the first pixel region AA1.

In FIG. 2, it is illustrated that a width of the first pixel region AA1 is equal to or substantially equal to a width of the second pixel region AA2, but the present disclosure is not limited thereto. For example, the first pixel region AA1 may have a shape of which a width is narrowed (e.g., gradually narrowed) as the first pixel region AA1 becomes more distant (e.g., extends away) from the second pixel region AA2.

In addition, the first pixel region AA1 may have a width that is narrower than a width of the second pixel region AA2. In this case, a number of first pixels PXL1 included in (or formed on) a horizontal line of the first pixel region AA1 may be smaller than a number of second pixels PXL2 included in (or formed on) a horizontal line of the second pixel region AA2.

In an embodiment of the present disclosure, the substrate 50 may have various shapes corresponding to the shapes of the pixel regions AA1 and AA2. The substrate 50 may be made of an insulative material, such as, for example, glass and/or resin. Also, the substrate 50 may be made of a material having flexibility to be bendable or foldable. The substrate 50 may have a single-layered structure or a multi-layered structure.

Components (e.g., drivers, lines, etc.) for driving the pixels PXL1 and PXL2 may be disposed in the peripheral region NA. The pixels PXL1 and PXL2 are not located (or formed) in the peripheral region NA, and accordingly, the peripheral region NA may be a non-display region. The peripheral region NA may be at the periphery of the pixel regions AA1 and AA2, and may have a shape surrounding at least portions of the pixel regions AA1 and AA2.

The pixel regions AA1 and AA2 include the first pixel region AA1 and the second pixel region AA2.

The second pixel region AA2 may have a larger area as compared with the area of the first pixel region AA1. The second pixels PXL2 are formed in the second pixel region AA2. The second pixels PXL2 generate light of a luminance (e.g., a predetermined luminance) corresponding to a data signal.

The first pixel region AA1 is located at one side of the second pixel region AA2, and may have a smaller area as compared with the area of the second pixel region AA2. The first pixels PXL1 are formed in the first pixel region AA1. The first pixels PXL1 generate light of a luminance (e.g., a predetermined luminance) corresponding to the data signal.

Each of the first pixels PXL1 and the second pixels PXL2 includes a driving transistor and an organic light emitting diode. The driving transistor controls the amount of current supplied to the organic light emitting diode, corresponding to the data signal. A gate electrode of the driving transistor may be initialized to a voltage of an initialization power source before the driving transistor is supplied with the data signal. In addition, an anode electrode of the organic light emitting diode may be initialized to a voltage of an initialization power source before the organic light emitting diode emits light. Here, the voltage of the initialization power source that is supplied to the gate electrode of the driving transistor and the voltage of the initialization power source that is supplied to the anode electrode of the organic light emitting diode may be equal or substantially equal to each other, or may be different from each other.

Figure 5A:
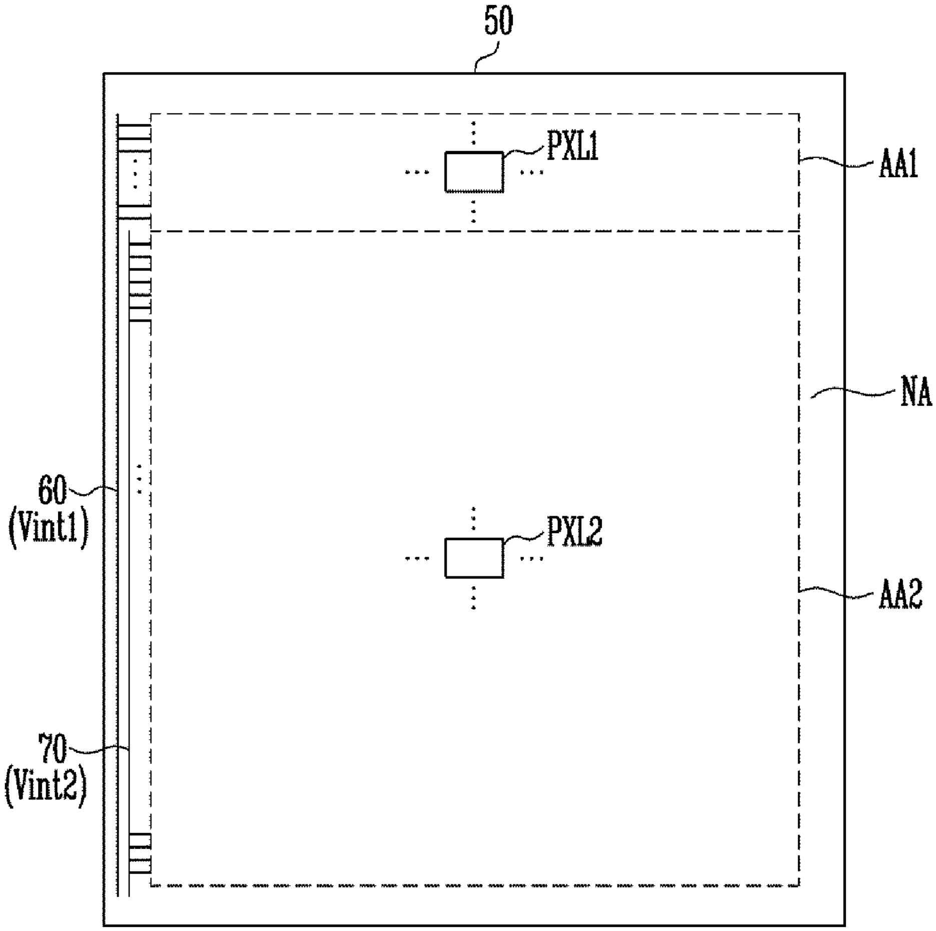
FIGS. 5A and 5B are views illustrating one or more embodiments of power lines formed on the substrate shown in FIG. 2.
Figure 5B:
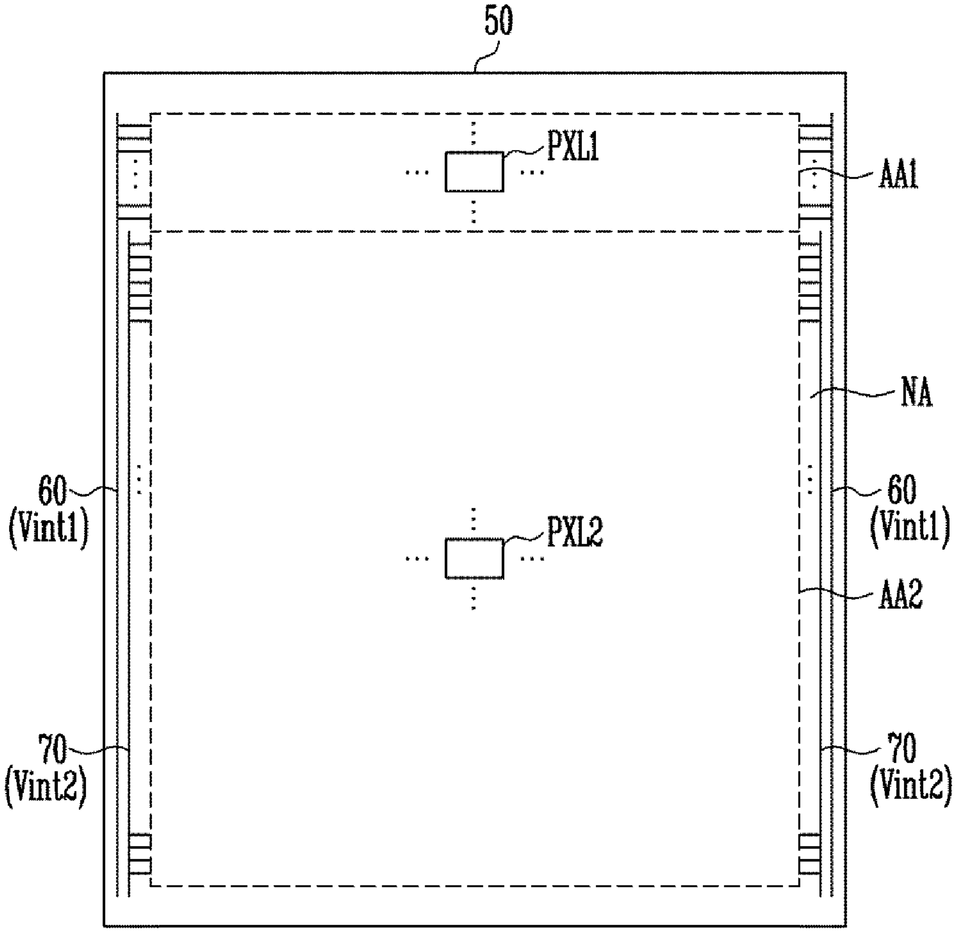

FIGS. 5A and 5B are views illustrating one or more embodiments of power lines formed on the substrate shown in FIG. 2. FIGS. 5A and 5B illustrate a case where initialization power sources having the same or substantially the same voltage are supplied to the gate electrode of the driving transistor and the anode electrode of the organic light emitting diode. For convenience of description, only power lines for supplying initialization power sources from among various components located in the peripheral region NA is illustrated in FIGS. 5A and 5B.

Referring to FIG. 5A, the display device according to an embodiment of the present disclosure includes a first power line 60 and a second power line 70.

The first power line 60 is formed in the peripheral region NA to be located at one side of the first pixel region AA1. Here, the first power line 60 may be formed to extend to the peripheral region NA adjacent to the second pixel region AA2. The first power line 60 is electrically coupled to the first pixels PXL1. The first power line 60 supplies a voltage of a first initialization power source Vint1 to the first pixels PXL1.

The second power line 70 is formed in the peripheral region NA to be located at one side of the second pixel region AA2. The second power line 70 is electrically coupled to the second pixels PXL2. The second power line 70 supplies a voltage of the second initialization power source Vint2 to the second pixels PXL2.

The second initialization power source Vint2 maintains or substantially maintains a constant voltage regardless of the mode (e.g., the first mode or the second mode) of the display device. For example, the second initialization power source Vint may have a voltage lower than a voltage of the data signal, and may initialize the gate electrode of the driving transistor. After that, for convenience of description, it is assumed that the voltage of the second initialization power source Vint2 is a second voltage.

The voltage of the first initialization power source Vint1 is variously changed corresponding to the mode (e.g., the first mode or the second mode) of the display device. For example, when the display device is driven in the first mode, the first initialization power source Vint1 may have the second voltage that is equal or substantially equal to the voltage of the second initialization power source Vint2. In addition, when the display device is driven in the second mode, the first initialization power source Vint may have a first voltage that is different from the second voltage. Here, the first voltage may have a level that is higher than a level of the second voltage. That is, when the display device is driven in the second mode, the first initialization power source Vint1 may have a voltage higher than the voltage of the second initialization power source Vint2. This will be described in more detail later in conjunction with circuit structures of the pixels PXL1 and PXL2.

While a case where the first power line 60 and the second power line 70 are located at one side of the pixel regions AA1 and AA2 is illustrated in FIG. 5A, the present disclosure is not limited thereto. For example, the first power line 60 and the second power line 70, as shown in FIG. 5B, may each be formed at both sides of the pixel regions AA1 and AA2.

Figure 6A:
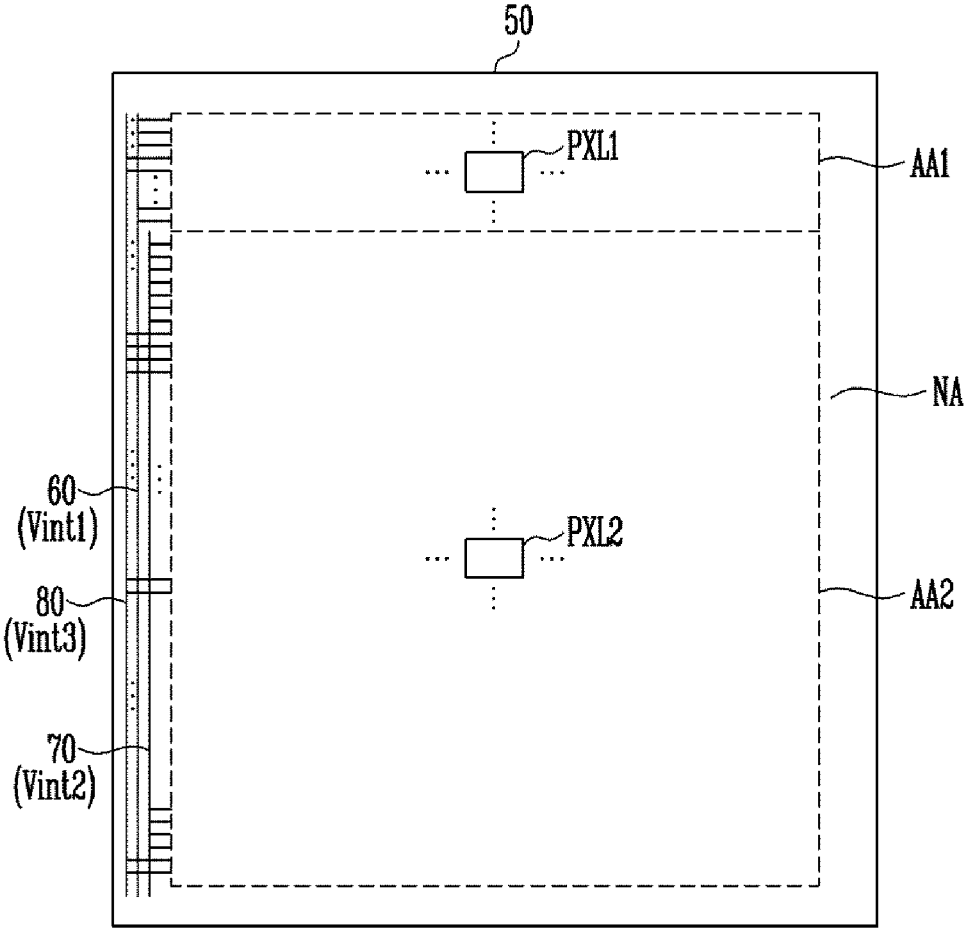
FIGS. 6A and 6B are views illustrating one or more embodiments of power lines formed on the substrate shown in FIG. 2.
Figure 6B:
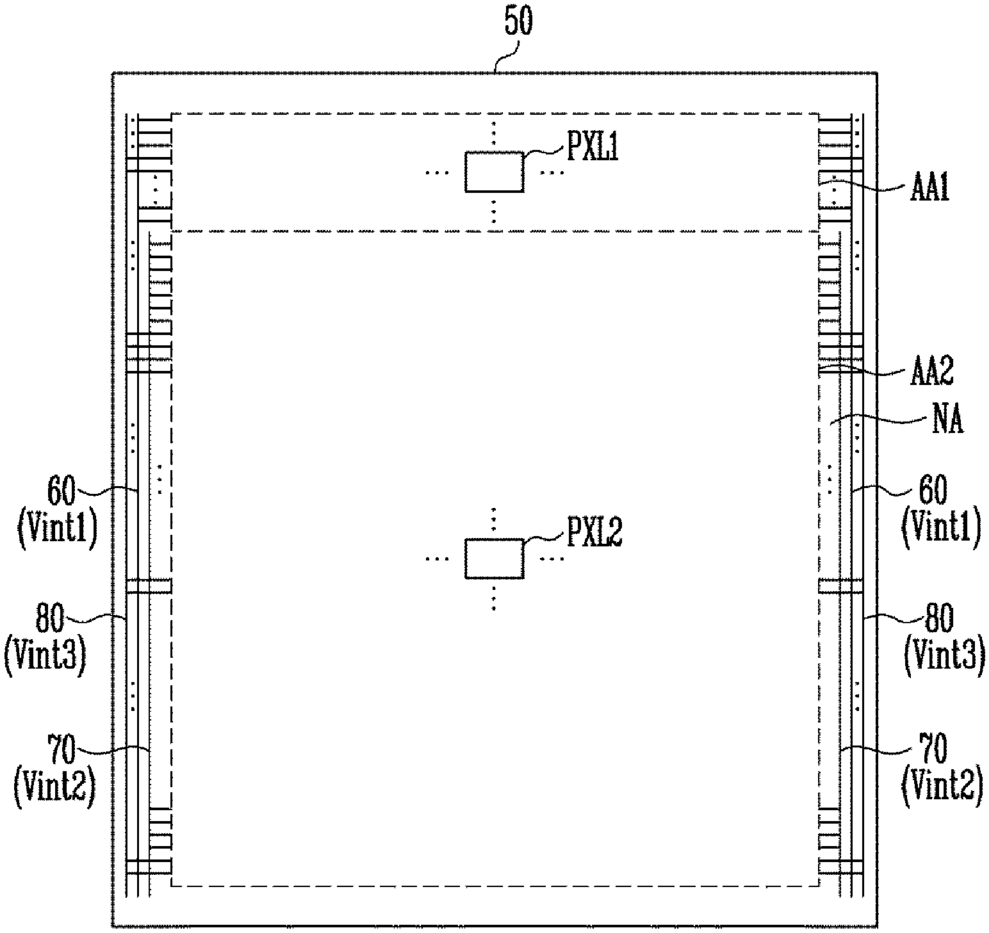

FIGS. 6A and 6B are views illustrating one or more embodiments of power lines formed on the substrate shown in FIG. 2. FIGS. 6A and 6B illustrate a case where initialization power sources having different voltages are supplied to the gate electrode of the driving transistor and the anode electrode of the organic light emitting diode. In FIGS. 6A and 6B, components that are the same or substantially the same as those of FIGS. 5A and 5B are designated by like reference numerals, and thus, their detailed descriptions will not be repeated.

Referring to FIGS. 6A and 6B, the display device, according to one or more embodiments of the present disclosure, includes a first power line 60, a second power line 70, and a third power line 80.

The first power line 60 is formed in the peripheral region NA at one side of the first pixel region AA1. The first power line 60 is electrically coupled to the first pixels PXL1. The first power line 60 supplies a voltage of a first initialization power source Vint1 to the first pixels PXL1. Here, the voltage of the first initialization power source Vint1 is supplied to the gate electrode of the driving transistor included in each of the first pixels PXL1.

The second power line 70 is formed in the peripheral region NA at one side of the second pixel region AA2. The second power line 70 is electrically coupled to the second pixels PXL2. The second power line 70 supplies a voltage of a second initialization power source Vint2 to the second pixel PXL2. Here, the voltage of the second initialization power source Vint2 is supplied to the gate electrode of the driving transistor included in each of the second pixels PXL2.

The third power line 80 is formed in the peripheral region NA at one side of each of the first pixel region AA1 and the second pixel region AA2. The third power line 80 is electrically coupled to each of the first pixels PXL1 and the second pixels PXL2. The third power line 80 supplies a voltage of a third initialization power source Vint3 to each of the first pixels PXL1 and the second pixels PXL2. Here, the third initialization power source Vint3 is supplied to the anode electrode of the organic light emitting diode included in each of the first pixels PXL1 and the second pixels PXL2.

The second initialization power source Vint2 maintains or substantially maintains a constant voltage regardless of the mode (e.g., the first mode or the second mode) of the display device. For example, the second initialization power source Vint2 may have a second voltage.

The voltage of the first initialization power source Vint may be variously changed corresponding to the mode (e.g., the first mode or the second mode) of the display device. When the display device is driven in the first mode, the first initialization power source Vint1 may have the second voltage. In addition, when the display device is driven in the second mode, the first initialization power source Vint1 may have a first voltage higher than the second voltage. When the first initialization power source Vint1 has the first voltage when the display device is driven in the second mode, leakage current from the first pixel PXL1 may be reduced or minimized.

The third initialization power source Vint3 maintains or substantially maintains a constant voltage regardless of the mode (e.g., the first mode or the second mode) of the display device. For example, the third initialization power source Vint3 may have a third voltage different from the first voltage and the second voltage. Here, the third voltage may be a voltage lower than the second voltage. This will be described in more detail later in conjunction with structures of the pixels PXL1 and PXL2.

While a case where the first power line 60, the second power line 70, and the third power line 80 are located at one side of the pixel regions AA1 and AA2 is illustrated in FIG. 6A, the present disclosure is not limited thereto. For example, the first power line 60, the second power line 70, and the third power line 80, as shown in FIG. 6B, may each be formed at both sides of the pixel regions AA1 and AA2.

Figure 7:
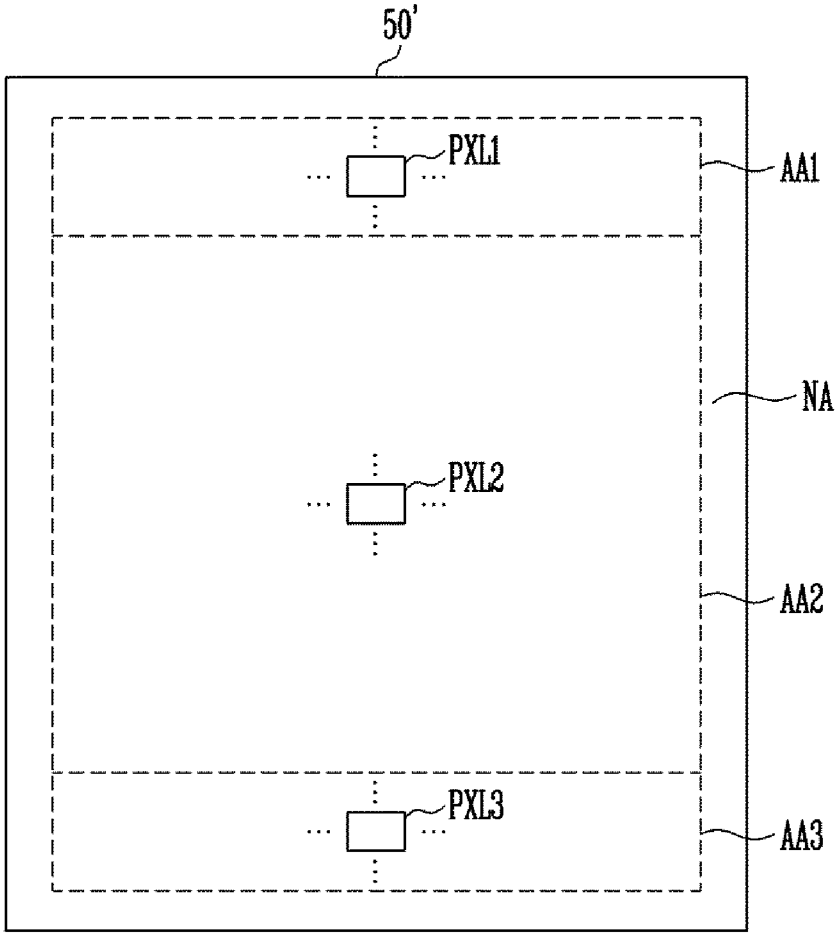
FIG. 7 is a view illustrating pixel regions of a display device according to another embodiment of the present disclosure.

FIG. 7 is a view illustrating pixel regions of a display device according to another embodiment of the present disclosure. In FIG. 7, components that are the same or substantially the same as those of FIG. 2 are designated by like reference numerals, and thus, their detailed descriptions may not be repeated.

Referring to FIG. 7, the display device, according to an embodiment of the present disclosure, includes pixel regions AA1, AA2, and AA3 and a peripheral region NA. In this case, the pixel regions AA1, AA2, and AA3 and the peripheral region NA may be on a substrate 50'.

A plurality of pixels PXL1, PXL2, PXL3 are located in the pixel regions AA1, AA2, and AA3, and accordingly, an image (e.g., a predetermined image) is displayed in the pixel regions AA1, AA2, and AA3. Therefore, the pixel regions AA1, AA2, and AA3 may be an effective display unit.

Figure 8:
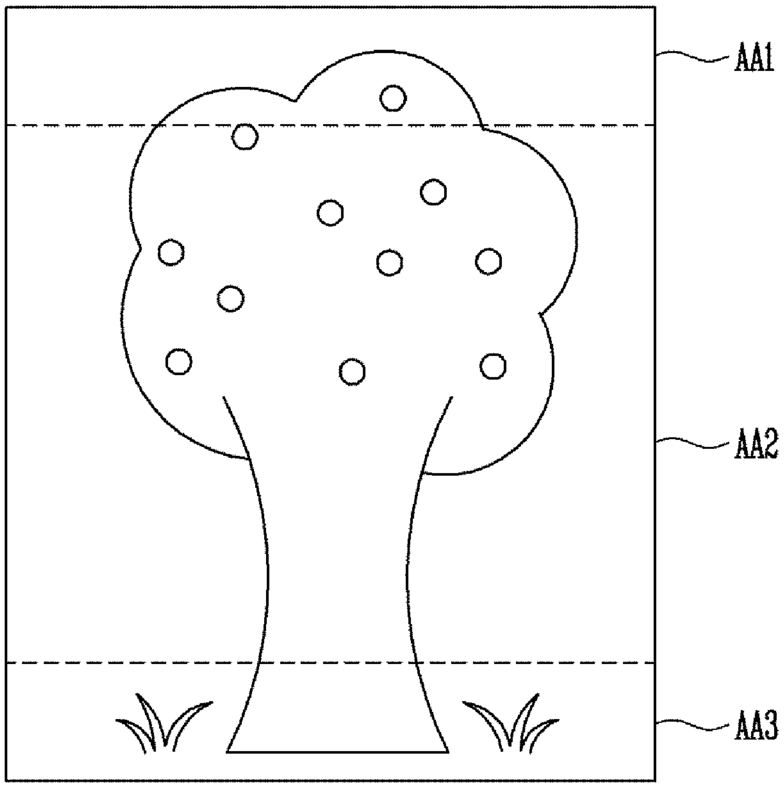
FIGS. 8 and 9 are views illustrating embodiments of images displayed in the pixel regions shown in FIG. 7, corresponding to modes.

When the display device is driven in the first mode, as shown in FIG. 8, an image (e.g., a predetermined image) is displayed in a first pixel region AA1, a second pixel region AA2, and a third pixel region AA3.

Figure 9:
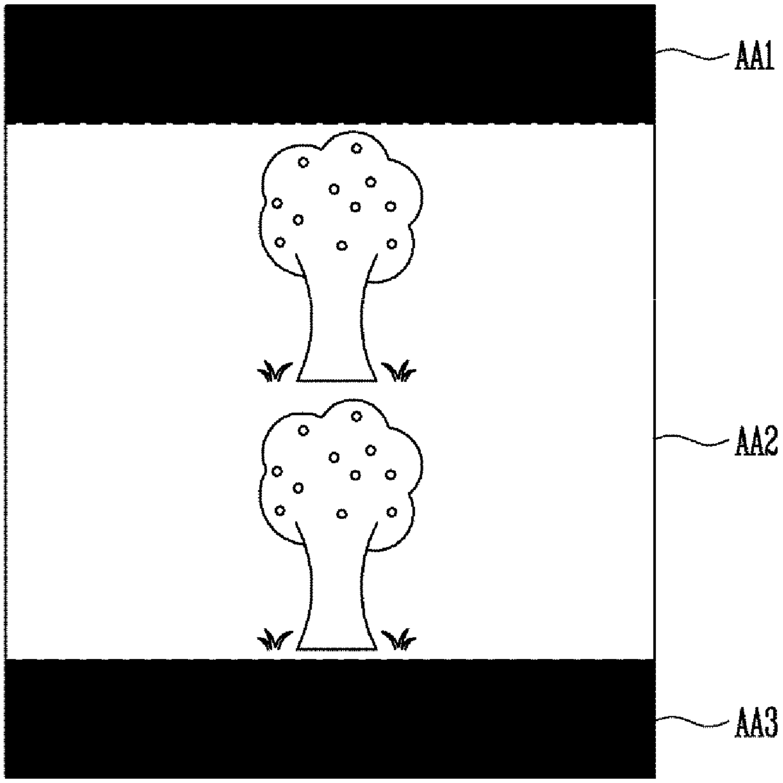

When the display device is driven in the second mode, as shown in FIG. 9, an image (e.g., a predetermined image) is displayed in the second pixel region AA2. At this time, first pixels PXL1 included in the first pixel region AA1 and third pixels PXL3 included in the third pixel region AA3 may be in the non-emission state. For example, when the display device is driven in the second mode, a black screen (or black image) may be displayed in the first pixel region AA1 and the third pixel region AA3.

Components (e.g., drivers, lines, etc.) for driving the pixels PXL1, PXL2, and PXL3 may be located in the peripheral region NA.

The pixel regions AA1, AA2, and AA3 include the first pixel region AA1, the second pixel region AA2, and the third pixel region AA3.

The first pixel region AA1 may be at one side of the second pixel region AA2, and the third pixel region AA3 may be at another side (e.g., an opposite side) of the second pixel region AA2. That is, the second pixel region AA2 may be between the first pixel region AA1 and the third pixel region AA3.

The third pixel region AA3 may have a smaller area as compared with an area of the second pixel region AA2. The third pixels PXL3 are formed in the third pixel region AA3. The third pixels PXL3 generate light of a luminance (e.g., a predetermined luminance) corresponding to a data signal.

Each of the first pixels PXL1, second pixels PXL2, and the third pixels PXL3 includes a driving transistor and an organic light emitting diode. The driving transistor controls the amount of current supplied to the organic light emitting diode, corresponding to the data signal. A gate electrode of the driving transistor is initialized to a voltage of an initialization power source before the driving transistor is supplied with the data signal. In addition, an anode electrode of the organic light emitting diode is initialized to a voltage of an initialization power source before the organic light emitting diode emits light. Here, the voltage of the initialization power source supplied to the gate electrode of the driving transistor and the voltage of the initialization power source supplied to the anode electrode of the organic light emitting diode may be equal or substantially equal to each other, or may be different from each other.

Figure 10A:
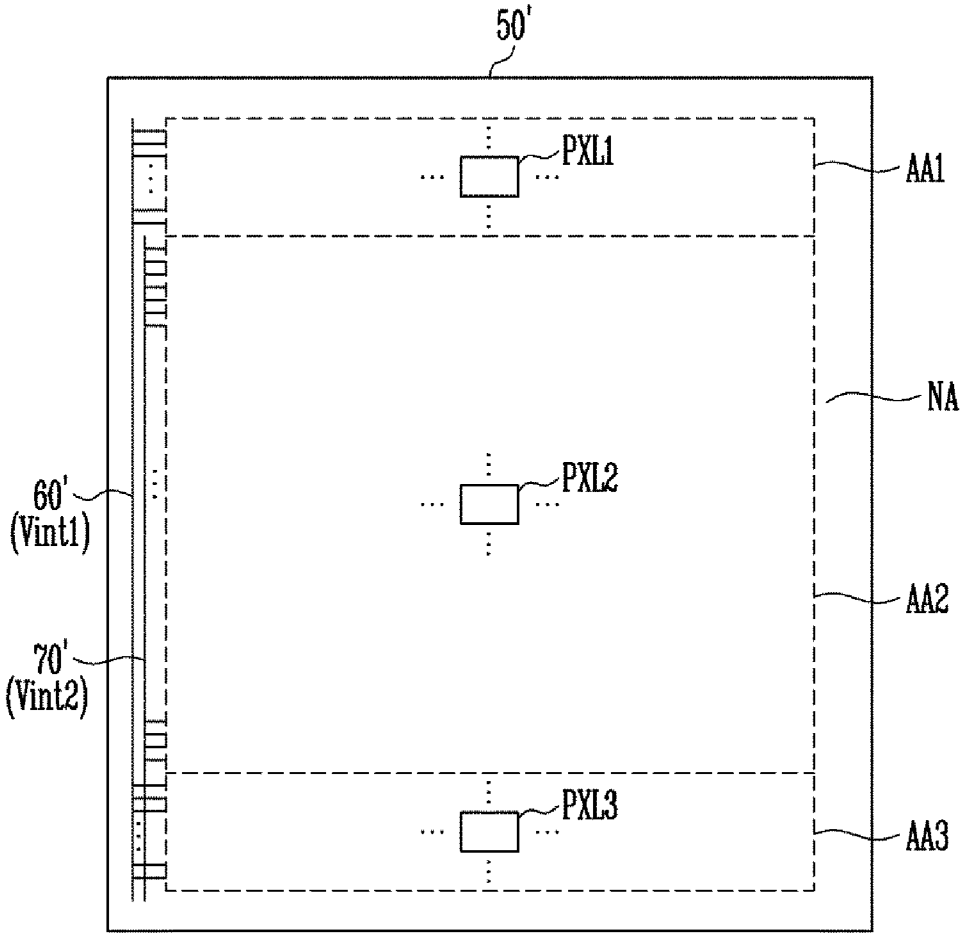
FIGS. 10A to 10C are views illustrating one or more embodiments of power lines formed on a substrate shown in FIG. 7.
Figure 10B:
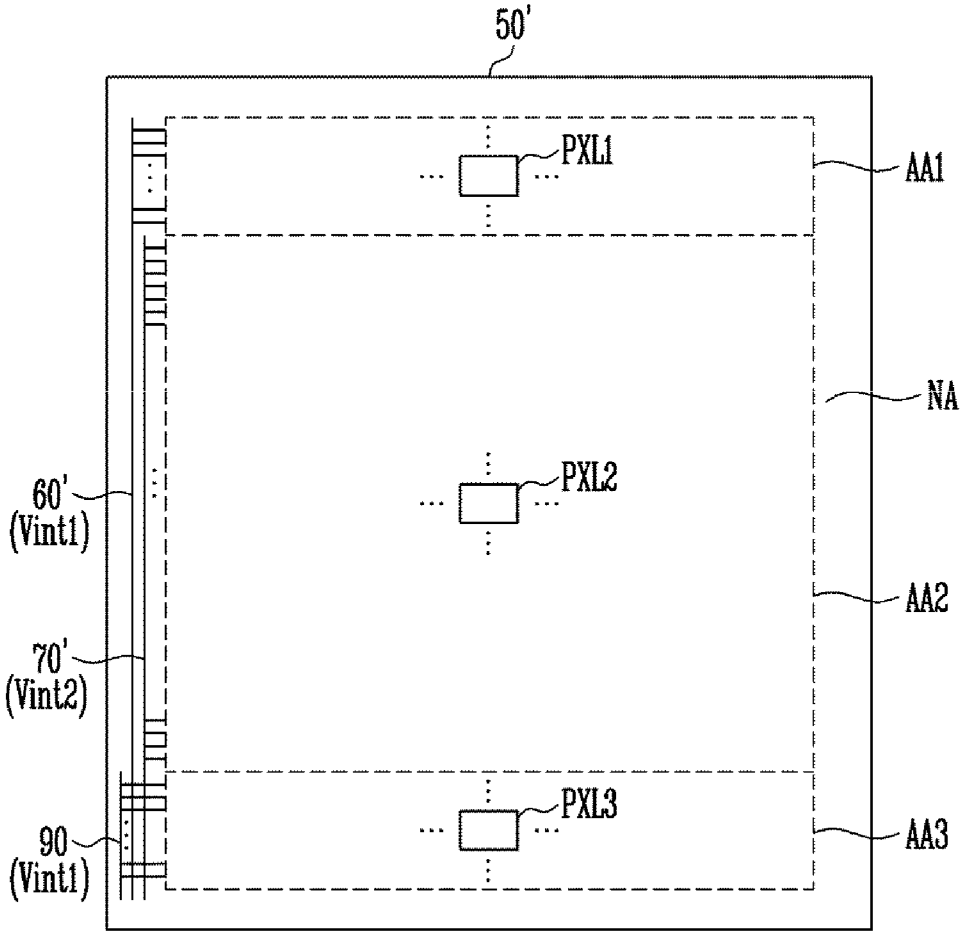
Figure 10C:
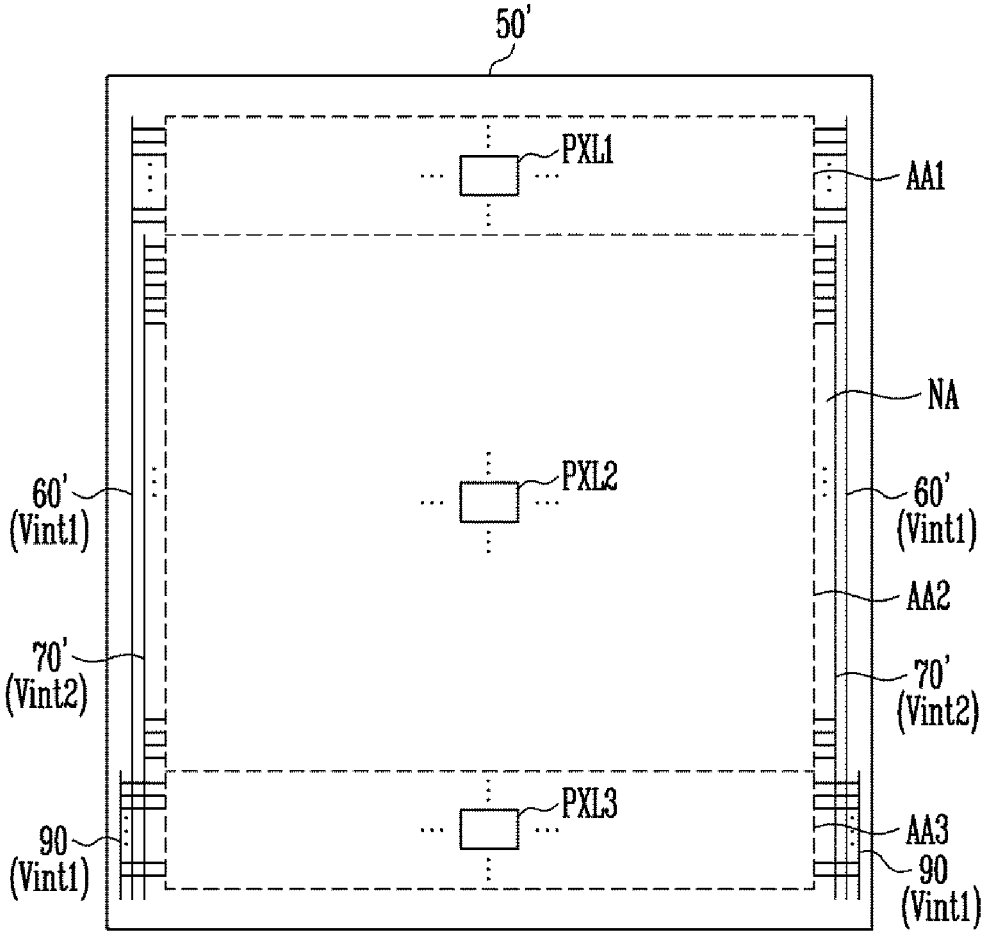

FIGS. 10A to 10C are views illustrating one or more embodiments of power lines formed on a substrate shown in FIG. 7. FIGS. 10A to 10C illustrate a case where initialization power sources having the same or substantially the same voltage are supplied to the gate electrode of the driving transistor and the anode electrode of the organic light emitting diode. For convenience of description, only power lines for supplying initialization power sources from among the various components in the peripheral region NA is illustrated in FIGS. 10A to 10C.

Referring to FIG. 10A, the display device, according to an embodiment of the present disclosure, includes a first power line 60' and a second power line 70'.

The first power line 60' is formed in the peripheral region NA at one side of each of the first pixel region AA1 and the third pixel region AA3. Here, the first power line 60' may be formed to pass through the peripheral region NA that is adjacent to the second pixel region AA2. The first power line 60' is electrically coupled to each of the first pixels PXL1 and the third pixels PXL3. The first power line 60' supplies a voltage of a first initialization power source Vint1 to each of the first pixels PXL1 and the third pixels PXL3.

The second power line 70' is formed in the peripheral region NA at one side of the second pixel region AA2. Here, the second power line 70' may be formed to extend to the peripheral region NA that is adjacent to the third pixel region AA3. The second power line 70' is electrically coupled to the second pixels PXL2. The second power line 70' supplies a voltage of a second initialization power source Vint2 to the second pixels PXL2.

The second initialization power source Vint2 maintains or substantially maintains a constant voltage regardless of the mode (e.g., the first mode or the second mode) of the display device. For example, the second initialization power source Vint2 may have a second voltage lower than a voltage of the data signal, and may initialize the gate electrode of the driving transistor.

The voltage of the first initialization power source Vint1 is variously changed corresponding to the mode (e.g., the first mode or the second mode) of the display device. For example, when the display device is driven in the first mode, the first initialization power source Vint1 may have the second voltage that is equal or substantially equal to the voltage of the second initialization power source Vint2. In addition, when the display device is driven in the second mode, the first initialization power source Vint1 may have a first voltage higher than the second voltage.

While a case where the first power line 60' is electrically coupled to each of the first pixels PXL1 and the third pixels PXL3 is illustrated in FIG. 10A, the present disclosure is not limited thereto. For example, as shown in FIG. 10B, the first power line 60' may be coupled to the first pixels PXL1, and a fourth power line 90 may be coupled to the third pixels PXL3.

The fourth power line 90 may be supplied with the first initialization power source Vint1 that is equal or substantially equal to the first initialization power source Vint1 of the first power line 60'. That is, when the display device is driven in the first mode, the fourth power line 90 may be supplied with the first initialization power source Vint1 having the second voltage. When the display device is driven in the second mode, the fourth power line 90 may be supplied with the first initialization power source Vint1 having the first voltage. Additionally, a voltage of an initialization power source supplied to the fourth power line 90 may be different from that of the first initialization power source Vint1 supplied to the first power line 60'. In this case, the voltage of the initialization power source supplied to the fourth power line 90 may be differently set corresponding to the mode of the display device, and may be experimentally determined such that leakage current from the third pixel PXL3 is reduced or minimized.

Additionally, a case where the first power line 60', the second power line 70', and the fourth power line 90 are located at one side of the pixel regions AA1, AA2, and AA3 is illustrated in FIGS. 10A and 10B, but the present disclosure is not limited thereto. For example, the first power line 60', the second power line 70', and the fourth power line 90, as shown in FIG. 10C, may each be formed at both sides of the pixel regions AA1, AA2, and AA3.

Figure 11A:
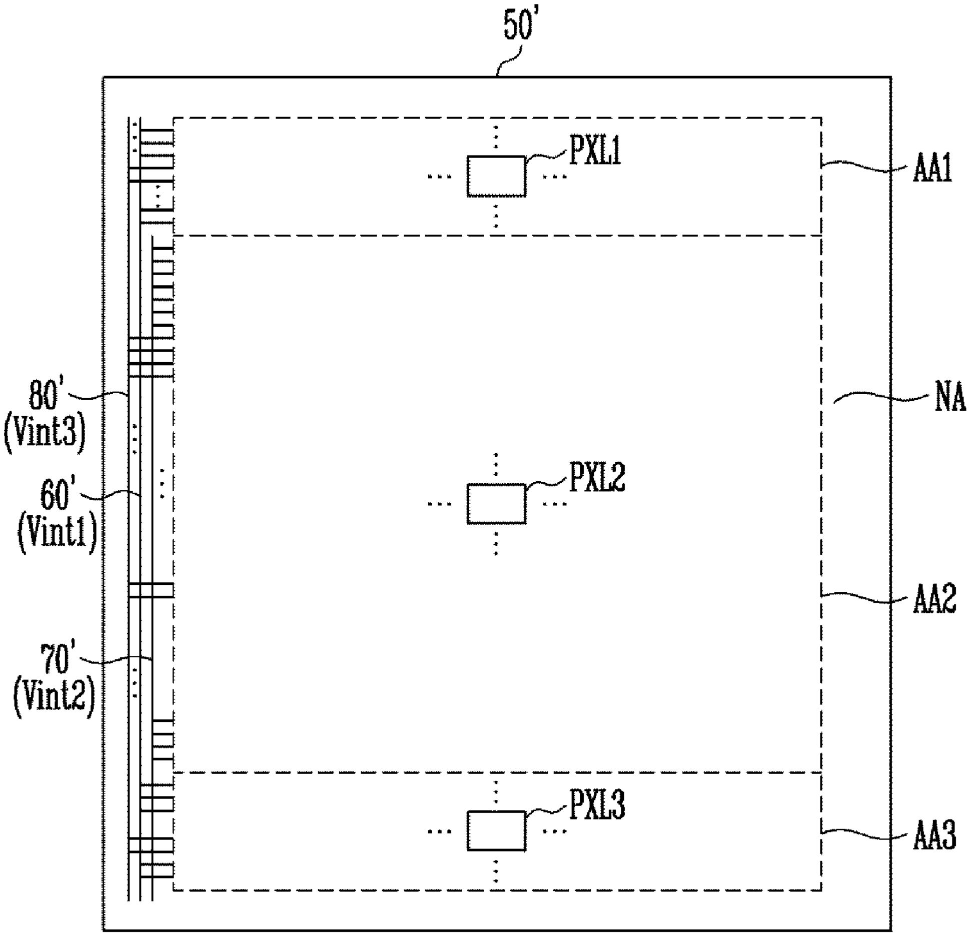
FIGS. 11A to 11C are views illustrating one or more embodiments of power lines formed on the substrate shown in FIG. 7.
Figure 11B:
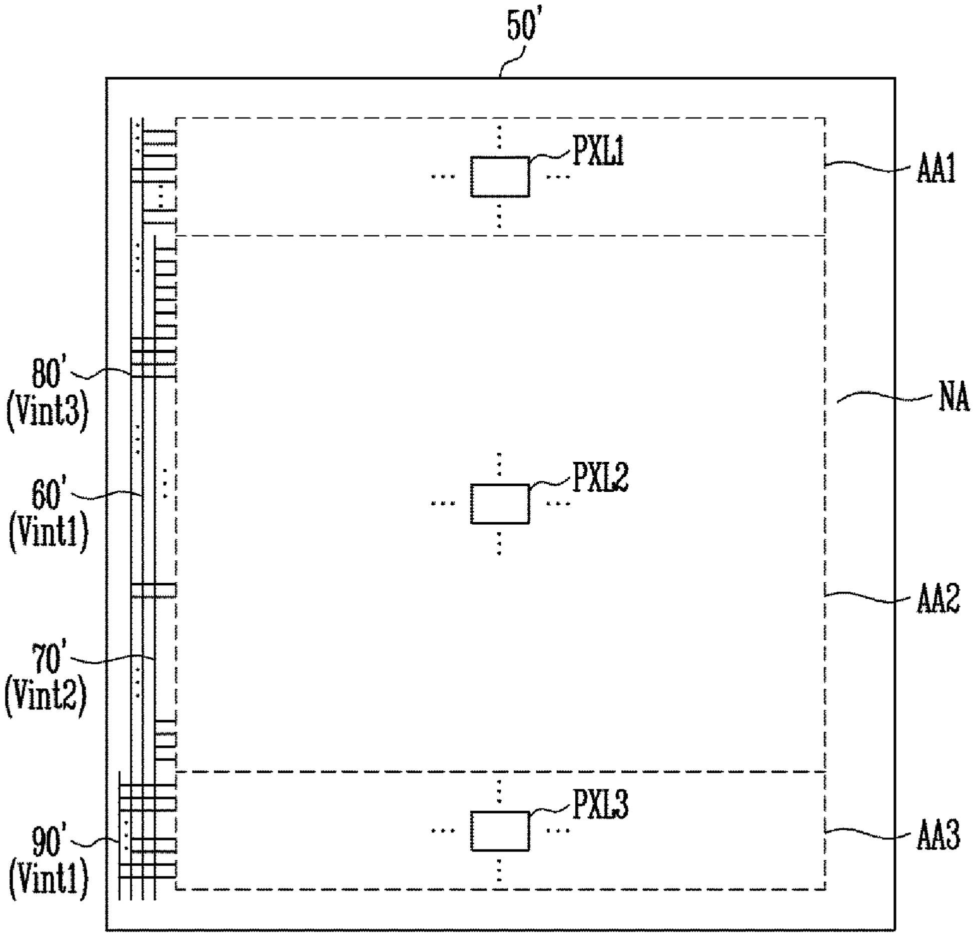
Figure 11C:
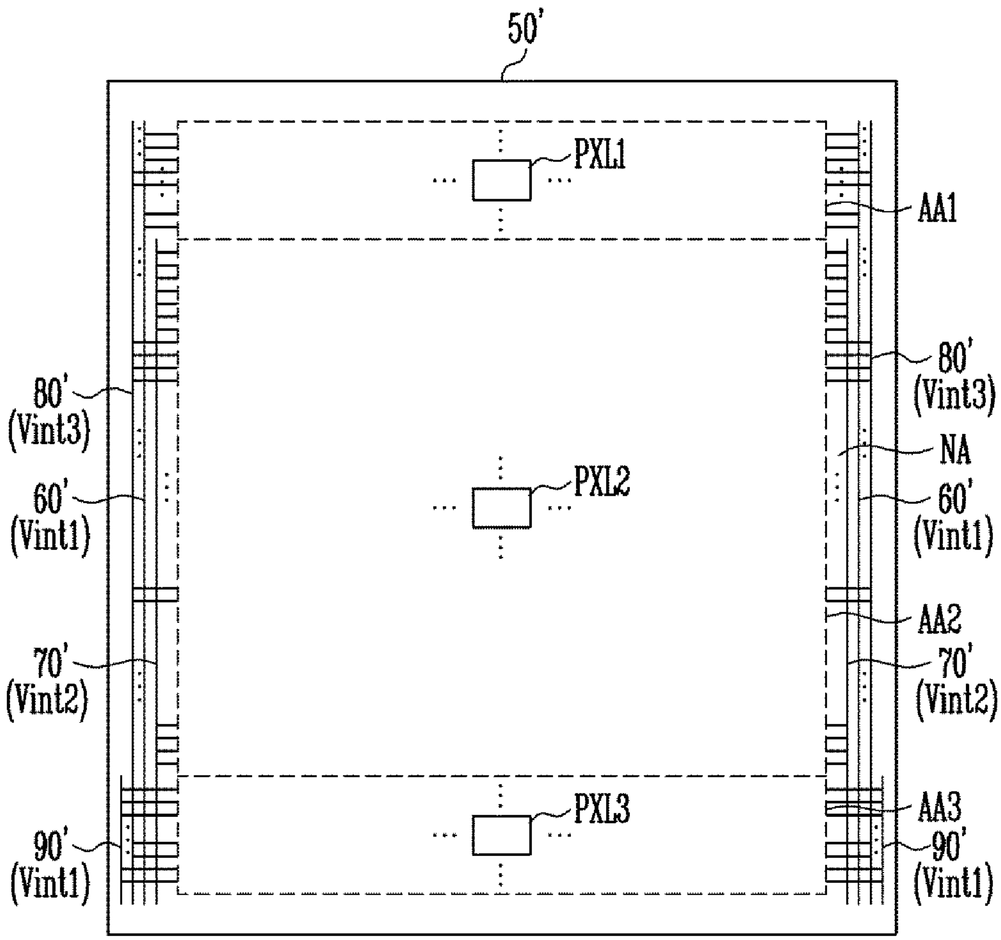

FIGS. 11A to 11C are views illustrating one or more embodiments of power lines formed on the substrate shown in FIG. 7. FIGS. 11A to 11C illustrate a case where initialization power sources having different voltages are supplied to the gate electrode of the driving transistor and the anode electrode of the organic light emitting diode. In FIGS. 11A to 11C, components that are the same or substantially the same as those of FIGS. 10A to 10C are designated by like reference numerals, and their detailed descriptions may not be repeated.

Referring to FIG. 11A, the display device, according to an embodiment of the present disclosure, includes a first power line 60', a second power line 70', and a third power line 80'.

The first power line 60' is formed in the peripheral region NA at one side of each of the first pixel region AA1 and the third pixel region AA3. The first power line 60' is electrically coupled to each of the first pixels PXL1 and the third pixels PXL3. The first power line 60' supplies a voltage of a first initialization power source Vint1 to each of the first pixels PXL1 and the third pixels PXL3. Here, the voltage of the first initialization power source Vint1 is supplied to the gate electrode of the driving transistor included in each of the first pixels PXL1 and the third pixel PXL3.

The second power line 70' is formed in the peripheral region NA at one side of the second pixel region AA2. The second power line 70' is electrically coupled to the second pixels PXL2. The second power line 70' supplies a voltage of a second initialization power source Vint2 to the second pixels PXL2. Here, the voltage of the second initialization power source Vint2 is supplied to the gate electrode of the driving transistor included in each of the second pixels PXL2.

The third power line 80' is formed in the peripheral region NA at one side of each of the first pixel region AA1, the second pixel region AA2, and the third pixel region AA3. The third power line 80' is electrically coupled to each of the first pixels PXL1, the second pixels PXL2, and the third pixels PXL3. The third power line 80' supplies a voltage of a third initialization power source Vint3 to each of the first pixels PXL1, the second pixels PXL2, and the third pixels PXL3. Here, the voltage of the third initialization power source Vint3 is supplied to the anode electrode of the organic light emitting diode included in each of the first pixels PXL1, the second pixels PXL2, and the third pixels PXL3.

The second initialization power source Vint2 maintains or substantially maintains a constant voltage regardless of the mode (e.g., the first mode or the second mode) of the display device. For example, the second initialization power source Vint2 may have a second voltage.

The voltage of the first initialization power source Vint1 is variously changed corresponding to the mode (e.g., the first mode or the second mode) of the display device. When the display device is driven in the first mode, the first initialization power source Vint1 may have the second voltage. In addition, when the display device is driven in the second mode, the first initialization power source Vint1 may have a first voltage higher than the second voltage. When the first initialization power source Vint1 has the first voltage when the display device is driven in the second mode, leakage current from the first pixel PXL1 and the third pixel PXL3 may be reduced or minimized.

The third initialization power source Vint3 maintains or substantially maintains a constant voltage regardless of the mode (e.g., the first mode or the second mode) of the display device. For example, the third initialization power source Vint3 may have a third voltage different from the first voltage and the second voltage. Here, the third voltage may have a voltage lower than the second voltage.

While a case where the first power line 60' is electrically coupled to each of the first pixels PXL1 and the third pixels PXL3 is illustrated in FIG. 11A, the present disclosure is not limited thereto. For example, as shown in FIG. 11B, the first power line 60' may be coupled to the first pixels PXL1, and a fourth power line 90' may be coupled to the third pixels PXL3.

The fourth power line 90' may be supplied with the first initialization power source Vint1 that is equal or substantially equal to that of the first power line 60'. That is, when the display device is driven in the first mode, the fourth power line 90' may be supplied with the first initialization power source Vint1 having the second voltage. When the display device is driven in the second mode, the fourth power line 90' may be supplied with the first initialization power source Vint1 having the first voltage.

Additionally, a voltage of an initialization power source supplied to the fourth power line 90' may be different from that of the first initialization power source Vint1 supplied to the first power line 60'. In this case, the voltage of the initialization power source supplied to the fourth power line 90' may be different corresponding to the mode of the display device, and may be experimentally determined such that leakage current from the third pixel PXL3 is reduced or minimized.

Additionally, a case where the first power line 60', the second power line 70', the third power line 80', and the fourth power line 90' are located at one side of the pixel regions AA1, AA2, and AA3 is illustrated in FIGS. 11A and 11B, but the present disclosure is not limited thereto. For example, the first power line 60', the second power line 70', the third power line 80', and the fourth power line 90', as shown in FIG. 11C, may each be formed at both sides of the pixel regions AA1, AA2, and AA3.

Figure 12:
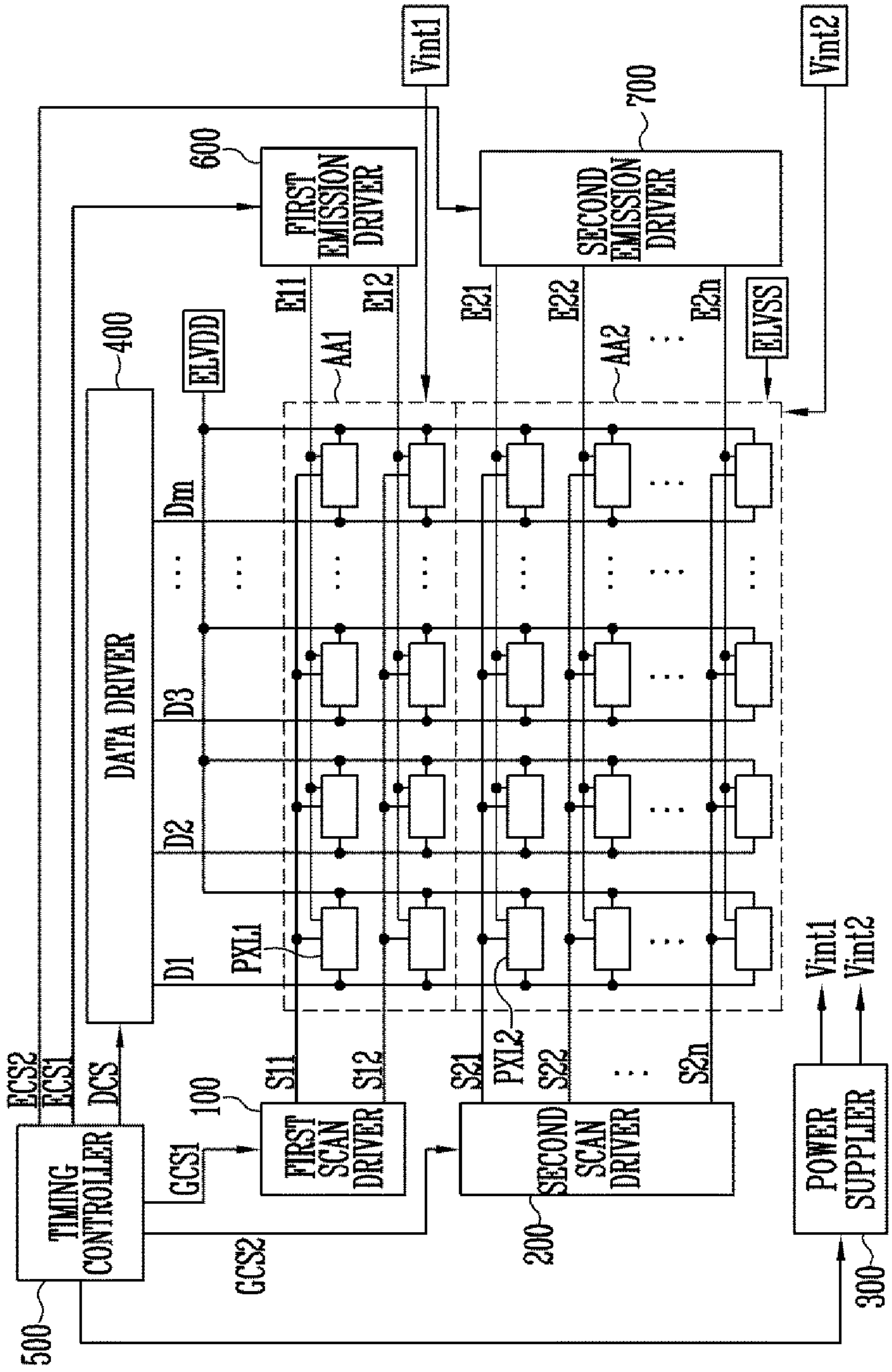
FIG. 12 is a view illustrating an embodiment of the display device corresponding to FIG. 2.

FIG. 12 is a view illustrating an embodiment of the display device corresponding to FIG. 2. FIG. 12 illustrates a case where initialization power sources having the same or substantially the same voltage are supplied to the gate electrode of the driving transistor and the anode electrode of the organic light emitting diode.

Referring to FIG. 12, the display device, according to an embodiment of the present disclosure, includes a first scan driver 100, a second scan driver 200, a power supplier 300, a data driver 400, a timing controller 500, a first emission driver 600, and a second emission driver 700.

A pixel region is divided into a first pixel region AA1 and a second pixel region AA2. The first pixel region AA1 includes first pixels PXL1, and the second pixel region AA2 includes second pixels PXL2.

The first pixels PXL1 are coupled to first scan lines S11 and S12, first emission control lines E11 and E12, and data lines D1 to Dm. The first pixels PXL1 are selected when a scan signal is supplied to the first scan lines S11 and S12 to receive a data signal supplied from the data lines D1 to Dm. The first pixels PXL1 that receive the data signal generate light of a luminance (e.g., a predetermined luminance) corresponding to the data signal. Here, the emission time of the first pixels PXL1 is controlled by an emission control signal supplied from the first emission control lines E11 and E12. In each of the first pixels PXL1, the gate electrode of the driving transistor is initialized to a voltage of a first initialization power source Vint1 before the data signal is supplied.

The second pixels PXL2 are coupled to second scan lines S21 to S2*n*, second emission control lines E21 to E2*n*, and the data lines D1 to Dm. The second pixels PXL2 are selected when a scan signal is supplied to the second scan lines S21 to S2*n* to receive a data signal supplied from the data lines D1 to Dm. The second pixels PXL2 that receive the data signal generate light of a luminance (e.g., a predetermined luminance) corresponding to the data signal. Here, the emission time of the second pixels PXL2 is controlled by an emission control signal supplied from the second emission control lines E21 to E2*n*. In each of the second pixels PXL2, the gate electrode of the driving transistor is initialized to a voltage of a second initialization power source Vint2 before the data signal is supplied.

While a case where two first scan lines S11 and S12 and two first emission control lines E11 and E12 are provided in the first pixel region AA1 is illustrated in FIG. 12, the present disclosure is not limited thereto. For example, two or more first scan lines S11 and S12 and two or more first emission lines E11 and E12 may be provided in the first pixel region AA1. In addition, one or more dummy scan lines and one or more dummy emission control lines may be additionally provided in the pixel regions AA1 and AA2, corresponding to circuit structures of the pixels PXL1 and PXL2.

The power supplier 300 generates the first initialization power source Vint1 and the second initialization power source Vint2, corresponding to a mode signal of the timing controller 500. The mode signal may be a signal corresponding to the first mode or the second mode.

The first initialization power source Vint1 generated by the power supplier 300 is supplied to the first pixels PXL1 via a first power line 60. In addition, the second initialization power source Vint2 generated by the power supplier 300 is supplied to the second pixels PXL2 via a second power line 70.

Figure 15:
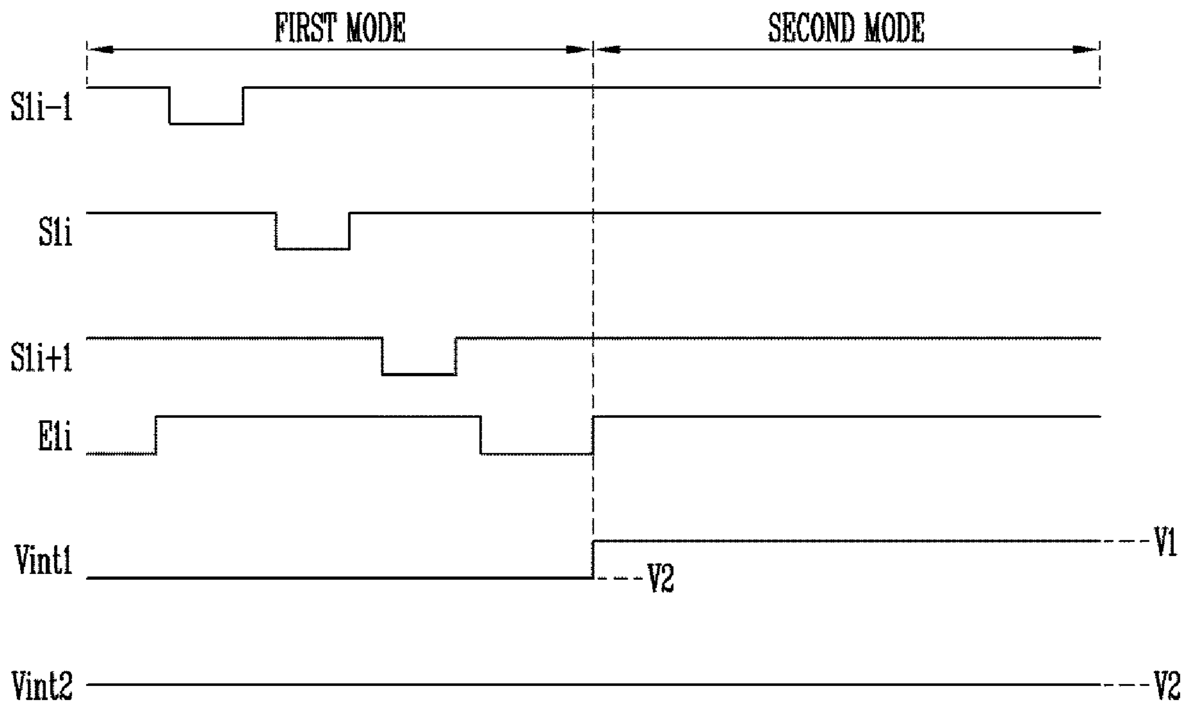
FIG. 15 is a waveform diagram illustrating an embodiment of a driving method when the first pixel shown in FIG. 13 is driven in a first mode and a second mode.

As shown in FIG. 15, the power supplier 300 generates the first initialization power source Vint1 and the second initialization power source Vint2, which may have the same voltage, e.g., a second voltage V2, when the display device is driven in the first mode. Also, the power supplier 300 generates the second initialization power source Vint2 to have the second voltage V2, and generates the first initialization power source Vint1 to have a first voltage V1, when the display device is driven in the second mode. Here, the first voltage V1 may have a voltage higher than the second voltage V2, and accordingly, leakage current from the first pixels PXL1 may be reduced or minimized during a period in which the display device is driven in the second mode.

The first scan driver 100 supplies a scan signal to the first scan lines S11 and S12, corresponding to a first gate control signal GCS1 from the timing controller 500. For example, the first scan driver 100 may sequentially supply the scan signal to the first scan lines S11 and S12. When the scan signal is sequentially supplied to the first scan lines S11 and S12, the first pixels PXL1 are sequentially selected in units of horizontal lines. To this end, the scan signal may be set to a gate-on voltage, such that transistors included in the first pixels PXL1 may be turned on.

Meanwhile, when the display device is driven in the first mode, the first scan driver 100 supplies the scan signal to the first scan lines S11 and S12. When the display device is driven in the second mode, the first scan driver 100 does not supply the scan signal to the first scan lines S11 and S12. Thus, when the display device is driven in the second mode, the first scan lines S11 and S12 are set to a gate-off voltage.

The second scan driver 200 supplies a scan signal to the second scan lines S21 to S2*n*, corresponding to a second gate control signal GCS2 from the timing controller 500. For example, the second scan driver 200 may sequentially supply the scan signal to the second scan lines S21 to S2*n*. When the scan signal is sequentially supplied to the second scan lines S21 to S2*n*, the second pixels PXL2 are sequentially selected in units of horizontal lines. To this end, the scan signal is set to the gate-on voltage, such that transistors included in the second pixels PXL2 may be turned on.

Meanwhile, when the display device is driven in each of the first mode and the second mode, the second scan driver 200 supplies the scan signal to the second scan lines S21 to S2*n*. Thus, the second pixels PXL2 display an image (e.g., a predetermined image) regardless of the mode (e.g., the first mode or the second mode) of the display device.

The first emission driver 600 receives a first emission control signal ECS1 supplied from the timing controller 500. The first emission driver 600 when receiving the first emission control signal ECS1 supplies an emission control signal to the first emission control lines E11 and E12. For example, the first emission driver 600 may sequentially supply the emission control signal to the first emission control lines E11 and E12. The emission control signal is used to control the emission time of the first pixels PXL1. To this end, the emission control signal is set to the gate-off voltage, such that the transistors included in the first pixel PXL1 may be turned off.

Meanwhile, when the display device is driven in the first mode, the first emission driver 600 sequentially supplies the emission control signal to the first emission control lines E11 and E12. In addition, when the display device is driven in the second mode, the first emission driver 600 supplies the emission control signal to the first emission control lines E11 and E12 during a frame period. Thus, when the display device is driven in the second mode, the first emission control lines E11 and E12 are set to the gate-off voltage, and accordingly, the first pixels PXL1 are set to the non-emission state.

The second emission driver 700 receives a second emission control signal ECS2 supplied from the timing controller 500. The second emission driver 700 when receiving the second emission control signal ECS2 supplies an emission control signal to the second emission control lines E21 to E2*n*. For example, the second emission driver 700 may sequentially supply the emission control signal to the second emission control lines E21 to E2*n*. The emission control signal is used to control the emission time of the second pixel PXL2. To this end, the emission control signal is set to the gate-off voltage, such that the transistors included in the second pixel PXL2 may be turned off.

Meanwhile, when the display device is driven in each of the first mode and the second mode, the second emission driver 700 sequentially supplies the emission control signal to the second emission control lines E21 to E2*n*. Thus, the second pixels PXL2 display an image (e.g., a predetermined image) regardless of the mode (e.g., the first mode or the second mode) of the display device.

The data driver 400 receives a data control signal DCS supplied from the timing controller 500. The data driver 400 when receiving the data control signal DCS supplies a data signal to the data lines D1 to Dm to be synchronized with the scan signals.

The timing controller 500 generates the first gate control signal GCS1, the second gate control signal GCS2, the first emission control signal ECS1, the second emission control signal ECS2, and the data control signal DCS, based on timing signals supplied from the outside. Also, the timing controller 500 supplies the mode signal to the power supplier 300. Here, the mode signal may be supplied to at least one driver (e.g., at least one of 100, 200, 600, and 700).

The first gate control signal GCS1 generated by the timing controller 500 is supplied to the first scan driver 100, and the second gate control signal GCS2 generated by the timing controller 500 is supplied to the second scan driver 200. In addition, the first emission control signal ECS1 generated by the timing controller 500 is supplied to the first emission driver 600, and the second emission control signal ECS2 generated by the timing controller 500 is supplied to the second emission driver 700. In addition, the data control signal DCS generated by the timing controller 500 is supplied to the data driver 400.

Each of the first gate control signal GCS1 and the second gate control signal GCS2 includes a start signal and clock signals. The start signal controls the supply timing of the scan signals. The clock signals are used to shift the start signal.

Each of the first emission control signal ECS1 and the second emission control signal ECS2 includes an emission start signal and clock signals. The emission start signal controls the supply timing of the emission control signals. The clock signals are used to shift the emission start signal.

The data control signal DCS includes a source start signal, a source output enable signal, a source sampling clock, and the like. The source start signal controls a data sampling start time of the data driver 400. The source sampling clock controls a sampling operation of the data driver 400, based on a rising or falling edge. The source output enable signal controls an output timing of the data driver 400.

Figure 13:
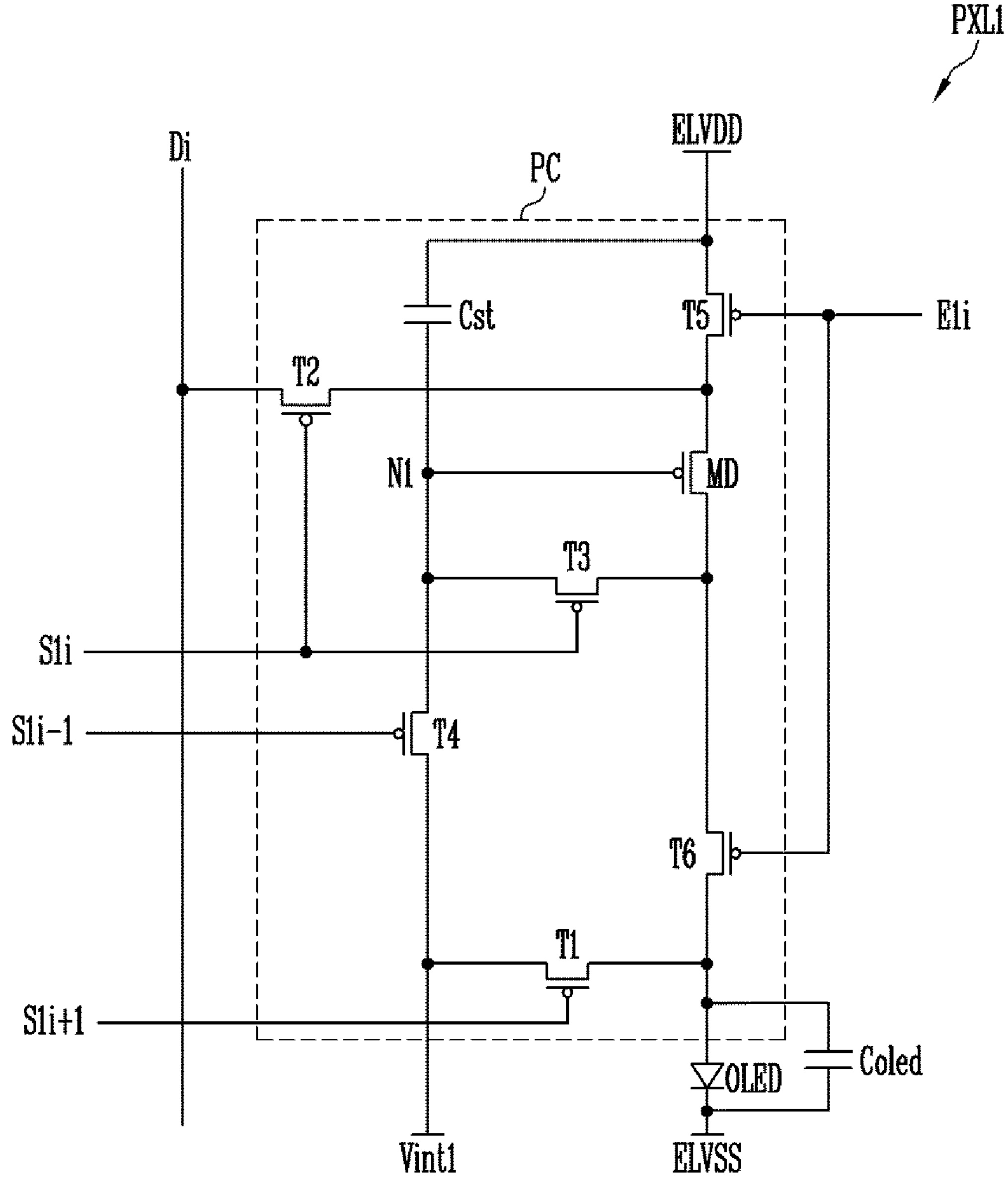
FIG. 13 is a view illustrating an embodiment of one of the first pixels shown in FIG. 12.

FIG. 13 is a view illustrating an embodiment of one of the first pixels shown in FIG. 12. For convenience of description, a first pixel PXL1 coupled to an ith (i is a natural number) data line Di and an ith first scan line S1*i* is illustrated in FIG. 13.

Referring to FIG. 13, the first pixel PXL1, according to an embodiment of the present disclosure, includes an organic light emitting diode OLED and a pixel circuit PC for controlling the amount of current supplied to the organic light emitting diode OLED.

An anode electrode of the organic light emitting diode OLED is coupled to the pixel circuit PC, and a cathode electrode of the organic light emitting diode OLED is coupled to a second power ELVSS. The organic light emitting diode OLED generates light of a luminance (e.g., a predetermined luminance) corresponding to the amount of current supplied from the pixel circuit PC. A first power source ELVDD may have a voltage higher than a voltage of the second power source ELVSS, such that current may flow through the organic light emitting diode OLED.

The pixel circuit PC includes a driving transistor MD, first to sixth transistors T1 to T6, and a storage capacitor Cst.

The first transistor T1 is coupled between a first initialization power source Vint1 and the anode electrode of the organic light emitting diode OLED. In addition, a gate electrode of the first transistor T1 is coupled to an (i+1)th first scan line S1*i*+1. The first transistor T1 is turned on when a scan signal is supplied to the (i+1)th first scan line S1*i*+1, to supply a voltage of the first initialization power source Vint1 to the anode electrode of the organic light emitting diode OLED.

When the first initialization power source Vint1 having a second voltage V2 is supplied to the anode electrode of the organic light emitting diode OLED, a parasitic capacitor (hereinafter, referred to as an "organic capacitor Coled") of the organic light emitting diode OLED is discharged. When the organic capacitor Coled is discharged, black expression ability of the display device may be enhanced.

In more detail, the organic capacitor Coled charges a voltage (e.g., a predetermined voltage) corresponding to current supplied from the pixel circuit PC during a previous frame period. If the organic capacitor Coled is charged, light may be easily emitted from the organic light emitting diode OLED by even a low current.

Meanwhile, a black data signal may be supplied to the pixel circuit PC during a current frame period. When the black data signal is supplied, the pixel circuit PC ideally supplies no current to the organic light emitting diode OLED. However, the pixel circuit PC formed with the transistors may supply a leakage current (e.g., a predetermined leakage current) to the organic light emitting diode OLED, even when the black data signal is supplied. At this time, if the organic capacitor Coled is in a charged state, the organic light emitting diode OLED may minutely emit light, and accordingly, the black expression ability of the display device may be degraded.

On the other hand, when the first initialization power source Vint1 having the second voltage V2 is supplied according to an embodiment of the present disclosure, the organic capacitor Coled is discharged, and accordingly, the organic light emitting diode OLED is set to the non-emission state, even when leakage current is supplied. That is, according to an embodiment of the present disclosure, the first initialization power source Vint1 having the second voltage V2 is supplied to the anode electrode of the organic light emitting diode OLED, so that the black expression ability of the display device may be enhanced.

Meanwhile, when the display device is driven in the first mode, the voltage of the first initialization power source Vint1 has the second voltage lower than a data signal. In addition, when the display device is driven in the second mode, the first initialization power source Vint1 has a first voltage V1 higher than the second voltage V2. Here, the first voltage V1 may have a voltage higher than any one voltage within a voltage range of data signals (or the data signal), such that leakage current from a first node N1 may be reduced or minimized.

A first electrode of the driving transistor MD is coupled to the first power ELVDD via the fifth transistor T5, and a second electrode of the driving transistor MD is coupled to the anode electrode of the organic light emitting diode OLED via the sixth transistor T6. In addition, a gate electrode of the driving transistor MD is coupled to the first node N1. The driving transistor MD controls the amount of current flowing from the first power source ELVDD to the second power source ELVSS via the organic light emitting diode OLED, corresponding to a voltage of the first node N1.

The second transistor T2 is coupled between the data line Di and the first electrode of the driving transistor MD. In addition, a gate electrode of the second transistor T2 is coupled to the ith first scan line S1*i*. The second transistor T2 is turned on when a scan signal is supplied to the ith first scan line S1*i*, to allow the data line Di and the first electrode of the driving transistor MD to be electrically coupled to each other.

The third transistor T3 is coupled between the second electrode of the driving transistor MD and the first node N1. In addition, a gate electrode of the third transistor T3 is coupled to the ith first scan line S1*i*. The third transistor T3 is turned on when the scan signal is supplied to the ith first scan line S1*i*, to allow the second electrode of the driving transistor MD and the first node N1 to be electrically coupled to each other. Thus, when the third transistor T3 is turned on, the driving transistor MD is diode-coupled.

The fourth transistor T4 is coupled between the first node N1 and the first initialization power source Vint1. In addition, a gate electrode of the fourth transistor T4 is coupled to an (i−1)th first scan line S1*i*−1. The fourth transistor T4 is turned on when a scan signal is supplied to the (i−1)th first scan line S1*i*−1, to supply the voltage of the first initialization power source Vint1 to the first node N1.

The fifth transistor T5 is coupled between the first power source ELVDD and the first electrode of the driving transistor MD. In addition, a gate electrode of the fifth transistor T5 is coupled to an ith first emission control line E1*i*. The fifth transistor T5 is turned off when an emission control signal is supplied to the ith first emission control line E1*i*, and is turned on otherwise.

The sixth transistor T6 is coupled between the second electrode of the driving transistor MD and the anode electrode of the organic light emitting diode OLED. In addition, a gate electrode of the sixth transistor T6 is coupled to the ith first emission control line E1*i*. The sixth transistor T6 is turned off when the emission control signal is supplied to the ith first emission control line E1*i*, and is turned on otherwise.

The storage capacitor Cst is coupled between the first power source ELVDD and the first node N1. The storage capacitor Cst stores a voltage corresponding to the data signal and a threshold voltage of the driving transistor MD.

Figure 14:
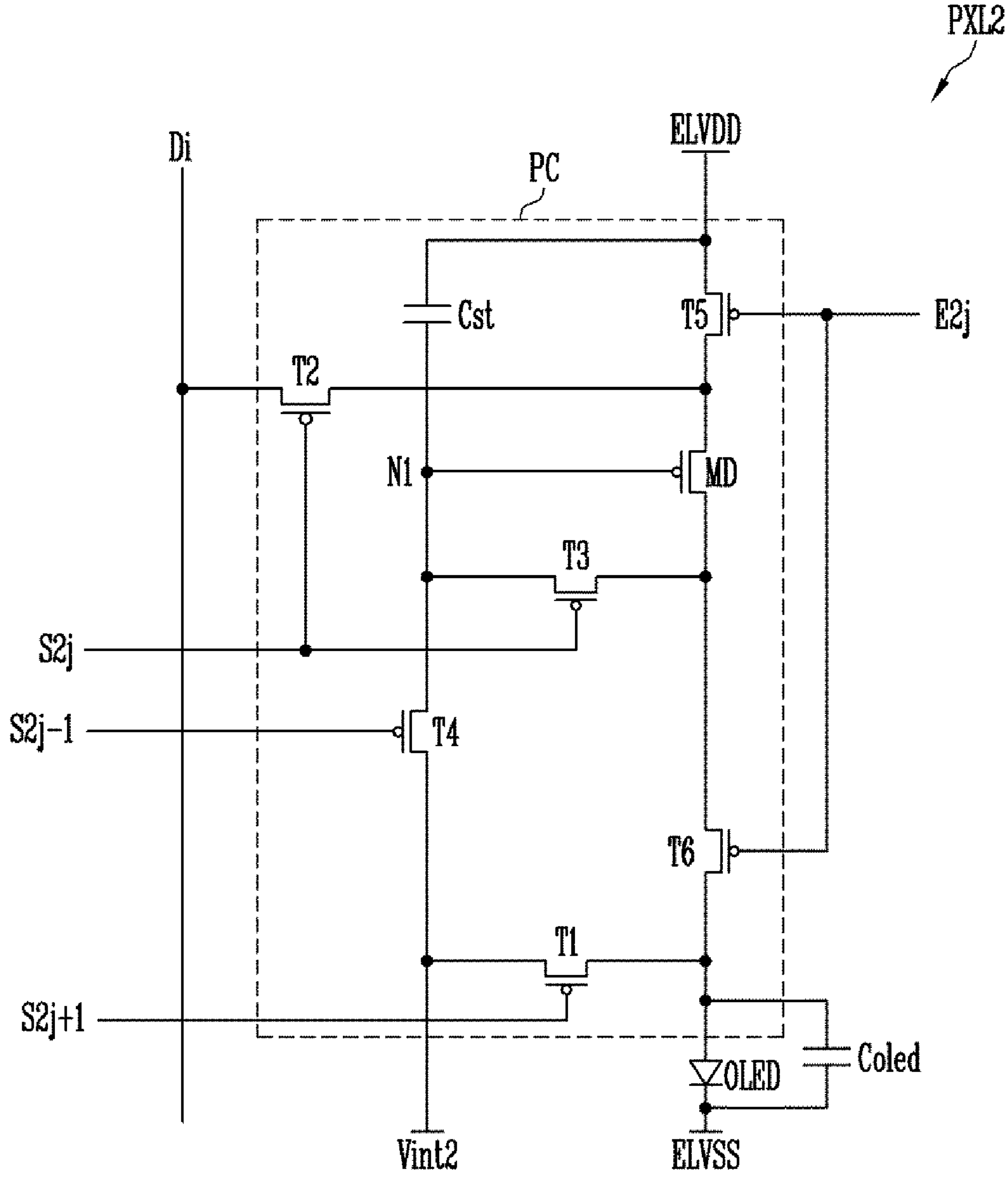
FIG. 14 is a view illustrating an embodiment of one of the second pixels shown in FIG. 12.

Meanwhile, the second pixel PXL2 may have the same or substantially the same pixel circuit structure as the first pixel PXL1 as shown in FIG. 14. However, signal lines S2*j*, S2*j*−1, S2*j*+1, and E2*j* coupled to the second pixel PXL2 are different corresponding to the position of the second pixel PXL2. In addition, fourth and first transistors T4 and T1 of the second pixel PXL2 are coupled to the second initialization power source Vint2.

In an embodiment of the present disclosure, the pixel structures of the pixels PXL1 and PXL2 are not limited to those of FIGS. 13 and 14. For example, in an embodiment of the present disclosure, each of the pixels PXL1 and PXL2 may have various suitable pixel structures, as long as the initialization power source Vint1 or Vint2 is supplied to the gate electrode of the driving transistor MD before the data signal is supplied.

FIG. 15 is a waveform diagram illustrating an embodiment of a driving method when the first pixel shown in FIG. 13 is driven in a first mode and a second mode.

A case where the display device is driven in the first mode will be described first with reference to FIG. 15.

First, the emission control signal is supplied to the ith first emission control line E1*i*. When the emission control signal is supplied to the ith first emission control line E1*i*, the fifth transistor T5 and the sixth transistor T6 are turned off.

When the fifth transistor T5 is turned off, the first power source ELVDD and the first electrode of the driving transistor MD are electrically separated (e.g., cut off) from each other. When the sixth transistor T6 is turned off, the second electrode of the driving transistor MD and the anode electrode of the organic light emitting diode OLED are electrically separated (e.g., cut off) from each other. Therefore, the first pixel PXL1 is set to the non-emission state during a period in which the emission control signal is supplied to the ith first emission control line E1*i*.

After the emission control signal is supplied to the ith first emission control line E1*i*, the scan signal is supplied to the (i−1)th first scan line S1*i*−1. When the scan signal is supplied to the (i−1)th first scan line S1*i*−1, the fourth transistor T4 is turned on. When the fourth transistor T4 is turned on, a voltage of the first initialization power source Vint1 is supplied to the first node N1. At this time, the first initialization power source Vint1 has the second voltage V2.

After the scan signal is supplied to the (i−1)th first scan line S1*i*−1, the scan signal is supplied to the ith first scan line S1*i*. When the scan signal is supplied to the ith first scan line S1*i*, the second transistor T2 and the third transistor T3 are turned on.

When the third transistor T3 is turned on, the second electrode of the driving transistor MD and the first node N1 are electrically coupled to each other. That is, when the third transistor T3 is turned on, the driving transistor MD is diode-coupled.

When the second transistor T2 is turned on, a data signal from the data line Di is supplied to the first electrode of the driving transistor MD. At this time, because the first node N1 has the second voltage V2 lower than the data signal corresponding to the first initialization power source Vint1, the driving transistor MD is turned on. When the driving transistor MD is turned on, a voltage obtained by subtracting a threshold voltage (e.g., an absolute threshold voltage) of the driving transistor MD from a voltage of the data signal, is supplied to the first node N1. At this time, the storage capacitor Cst stores a voltage corresponding to the first node N1.

After a voltage corresponding to the threshold voltage of the driving transistor MD and the data signal is stored in the storage capacitor Cst, the scan signal is supplied to the (i+1)th first scan line S1*i*+1. When the scan signal is supplied to the (i+1)th first scan line S1*i*+1, the first transistor T1 is turned on.

When the first transistor T1 is turned on, the voltage of the first initialization power source Vint1 is supplied to the anode electrode of the organic light emitting diode OLED. Then, the organic capacitor Coled of the organic light emitting diode OLED is discharged.

Afterwards, the supply of the emission control signal to the ith first emission control line E1*i* is stopped. When the supply of the emission control signal to the ith first emission control line E1*i* is stopped, the fifth transistor T5 and the sixth transistor T6 are turned on. When the fifth transistor T5 is turned on, the first power source ELVDD and the first electrode of the driving transistor MD are electrically coupled to each other. When the sixth transistor T6 is turned on, the second electrode of the driving transistor MD and the anode electrode of the organic light emitting diode OLED are electrically coupled to each other. At this time, the driving transistor MD controls the amount of current flowing from the first power source ELVDD to the second power source ELVSS via the organic light emitting diode OLED, corresponding to the voltage of the first node N1. Then, the organic light emitting diode OLED generates light of a luminance (e.g., a predetermined luminance) corresponding to the amount of current supplied from the driving transistor MD.

Meanwhile, when the display device is driven in the first mode and the second mode, the second pixel PXL2 is driven using the same or substantially the same method as that of the first pixel PXL1, and therefore, detailed description thereof will be omitted. However, when the display device is driven in the first mode and the second mode, the second pixel PXL2 generates light of a luminance (e.g., a predetermined luminance), corresponding to the above-described driving method.

A case where the display device is driven in the second mode will be described with reference to FIG. 15 as follows.

When the display device is driven in the second mode, the scan signal is not supplied to the first scan lines S1*i*−1 and S1*i*. When the scan signal is not supplied to the first scan lines S1*i*−1 and S1*i*, the voltage of the first scan lines S1*i*−1 and S1*i* are set to the gate-off voltage. Thus, the second transistor T2, the third transistor T3, and the first transistor T1 maintain a turn-off state during a period in which the display device is driven in the second mode.

The emission control signal is supplied to the first emission control line E1*i* during the period in which the display device is driven in the second mode. That is, the voltage of the first emission control line E1*i* is set to the gate-off voltage during the period in which the display device is driven in the second mode. When the gate-off voltage is supplied to the first emission control line E1*i*, the fifth transistor T5 and the sixth transistor T6 are set to the turn-off state. That is, the first pixels PXL1 are set to the non-emission state during the period in which the display device is driven in the second mode, and accordingly, a black screen (or black image) may be displayed in the first pixel region AA1.

Figure 16:
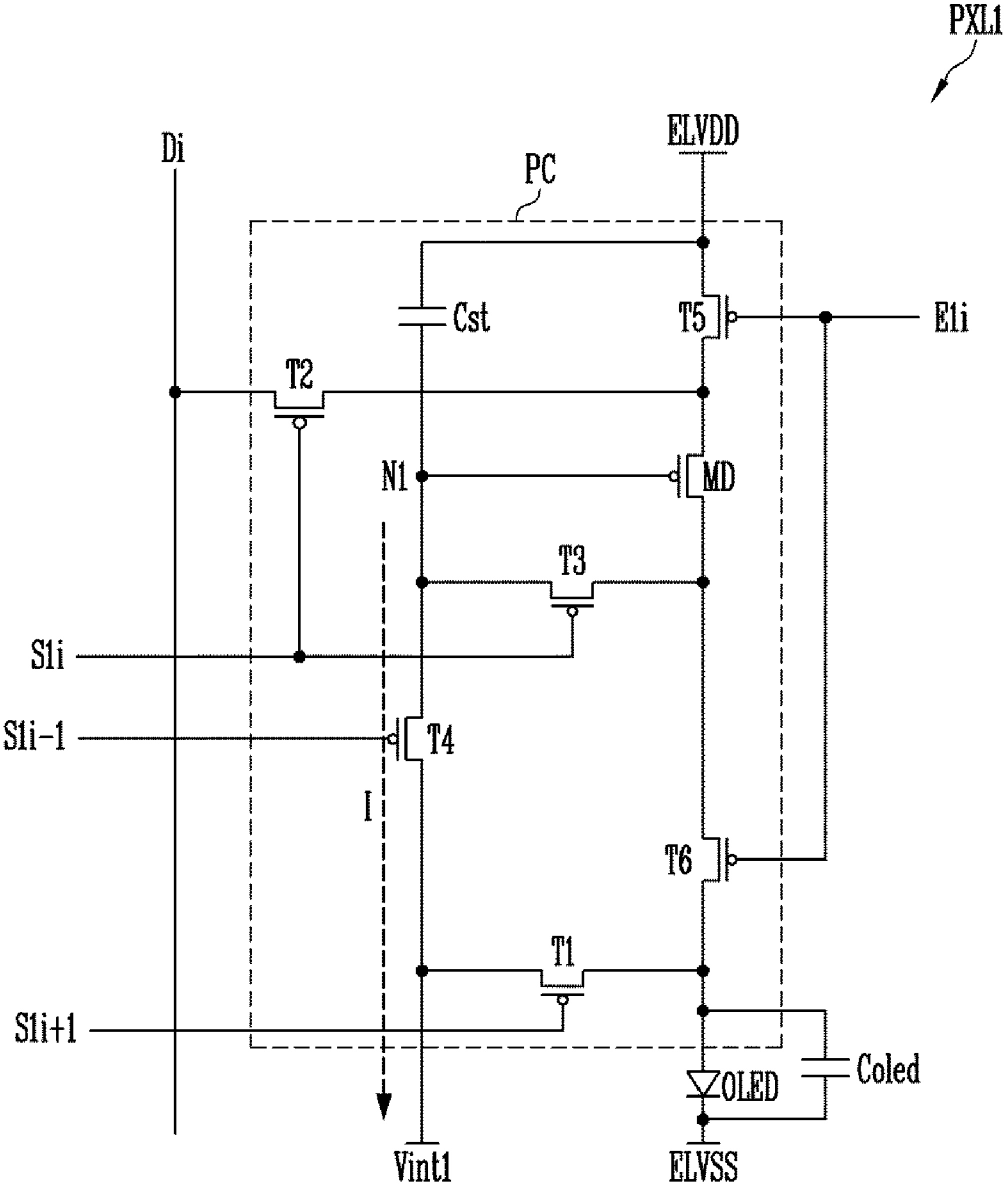
FIG. 16 is a view illustrating an embodiment of leakage current flowing in the pixel when a first initialization power source is set to the same voltage.

Meanwhile, a case where the voltage of the first initialization power source Vint1 is maintained or substantially maintained as the second voltage V2 during the period in which the display device is driven in the second mode will be described. If the voltage of the first initialization power source Vint1 is maintained or substantially maintained as the second voltage V2, a leakage current I may be supplied from the first node N1 to the first initialization power source Vint1 as shown in FIG. 16, and accordingly, the voltage of the first node N1 may be dropped down to the second voltage V2 (or approximately the second voltage V2).

If the voltage of the first node N1 is set to the second voltage V2, an on-bias voltage may be applied to the driving transistor MD, and accordingly, characteristics of the driving transistor MD may be changed. If the characteristics of the driving transistor MD are changed, a difference in luminance between the first pixel region and the second pixel region may occur when the display device is driven in the second mode and then driven in the first mode.

In order to reduce or prevent the difference in luminance, in an embodiment of the present disclosure, the voltage of the first initialization power source Vint1 is changed to the first voltage V1 higher than the second voltage V2 during the period in which the display device is driven in the second mode. Here, the first voltage V1 may be experimentally determined, such that the leakage current I from the first node N1 is reduced or minimized.

When the voltage of the initialization power source Vint1 has the first voltage V1 during the period in which the display device is driven in the second mode, the leakage current I supplied from the first node N1 to the first initialization power source Vint1 is prevented or substantially prevented. Then, the characteristics of the driving transistor MD are not changed during the period in which the display device is driven in the second mode, and accordingly, it may be possible to prevent or substantially prevent the difference in luminance between the first pixel region and the second pixel region.

Figure 17:
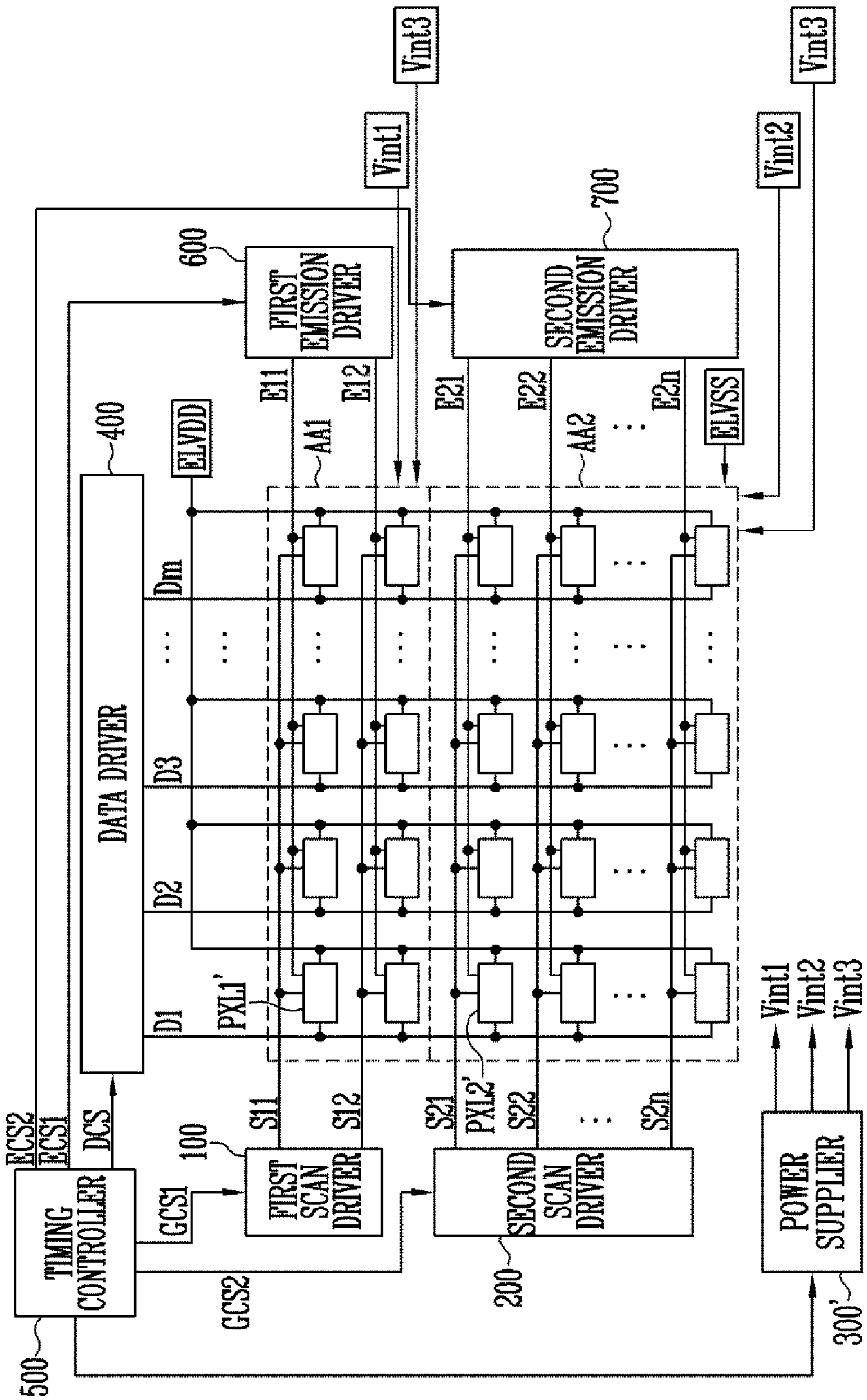
FIG. 17 is a view illustrating another embodiment of the display device corresponding to FIG. 2.

FIG. 17 is a view illustrating another embodiment of the display device corresponding to FIG. 2. FIG. 17 illustrates a case where initialization power sources having different voltages are supplied to the gate electrode of the driving transistor and the anode electrode of the organic light emitting diode. In FIG. 17, components that are the same or substantially the same as those of FIG. 12 are designated by like reference numerals, and thus, their detailed descriptions may not be repeated.

Referring to FIG. 17, the display device, according to an embodiment of the present disclosure, includes a first scan driver 100, a second scan driver 200, a power supplier 300', a data driver 400, a timing controller 500, a first emission driver 600, and a second emission driver 700.

First pixels PXL1' are coupled to first scan lines S11 and S12, first emission control lines E11 and E12, and data lines D1 to Dm. A driving transistor included in each of the first pixels PXL1' is initialized to a voltage of a first initialization power source Vint1 before a data signal is supplied. In addition, an anode electrode of an organic light emitting diode included in each of the first pixels PXL1' is initialized to a voltage of a third initialization power source Vint3.

Second pixels PXL2' are coupled to second scan lines S21 to S2*n*, second emission control lines E21 to E2*n*, and the data lines D1 to Dm. A driving transistor included in each of the second pixels PXL2' is initialized to a voltage of a second initialization power source before the data signal is supplied. In addition, an anode electrode of an organic light emitting diode included in each of the second pixels PXL2' is initialized to the voltage of the third initialization power source Vint3.

The power supplier 300' generates the first initialization power source Vint1, the second initialization power source Vint2, and the third initialization power source Vint3, corresponding to a mode signal of the timing controller 500.

The first initialization power source Vint1 generated by the power supplier 300' is supplied to the first pixels PXL1' via a first power line 60, and the second initialization power source Vint2 is supplied to the second pixels PXL2' via a second power line 70. In addition, the third initialization power source Vint3 is supplied to each of the first pixels PXL1' and the second pixels PXL2' via a third power line 80.

Figure 20:
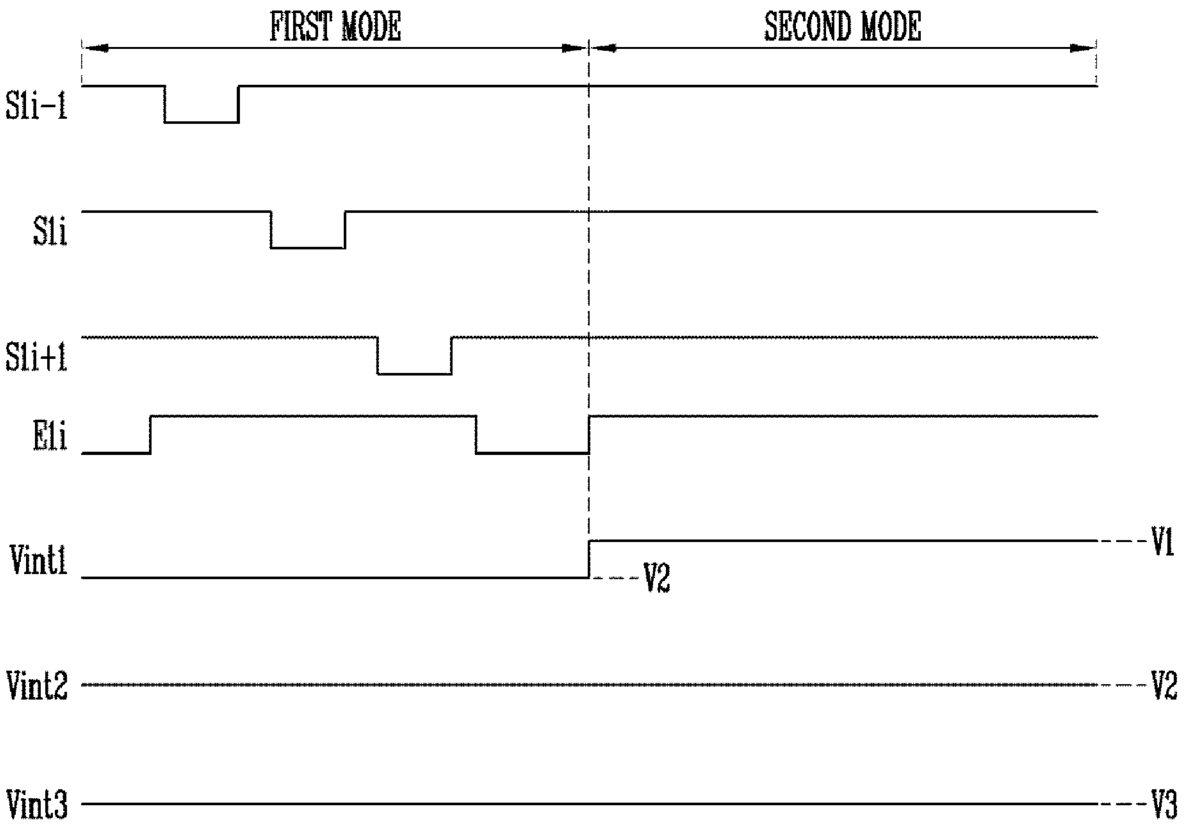
FIG. 20 is a waveform diagram illustrating an embodiment of a driving method when the first pixel shown in FIG. 18 is driven in the first mode and the second mode.

As shown in FIG. 20, the power supplier 300' generates the same or substantially the same voltage, e.g., the first initialization power source Vint1 and the second initialization power source Vint2, which have a second voltage V2, when the display device is driven in the first mode. Also, the power supplier 300' generates the second initialization power source Vint2 to have the second voltage V2, and generates the first initialization power source Vint1 to have a first voltage V1, when the display device is driven in the second mode. Here, the first voltage V1 has a voltage higher than the second voltage V2, and accordingly, leakage current from the first pixels PXL1' may be reduced or minimized during a period in which the display device is driven in the second mode.

In addition, the power supplier 300' generates the third initialization power source Vint3 having a third voltage V3, when the display device is driven in the first and second modes. Here, the third voltage V3 may have a voltage lower than the second voltage V2.

Figure 18:
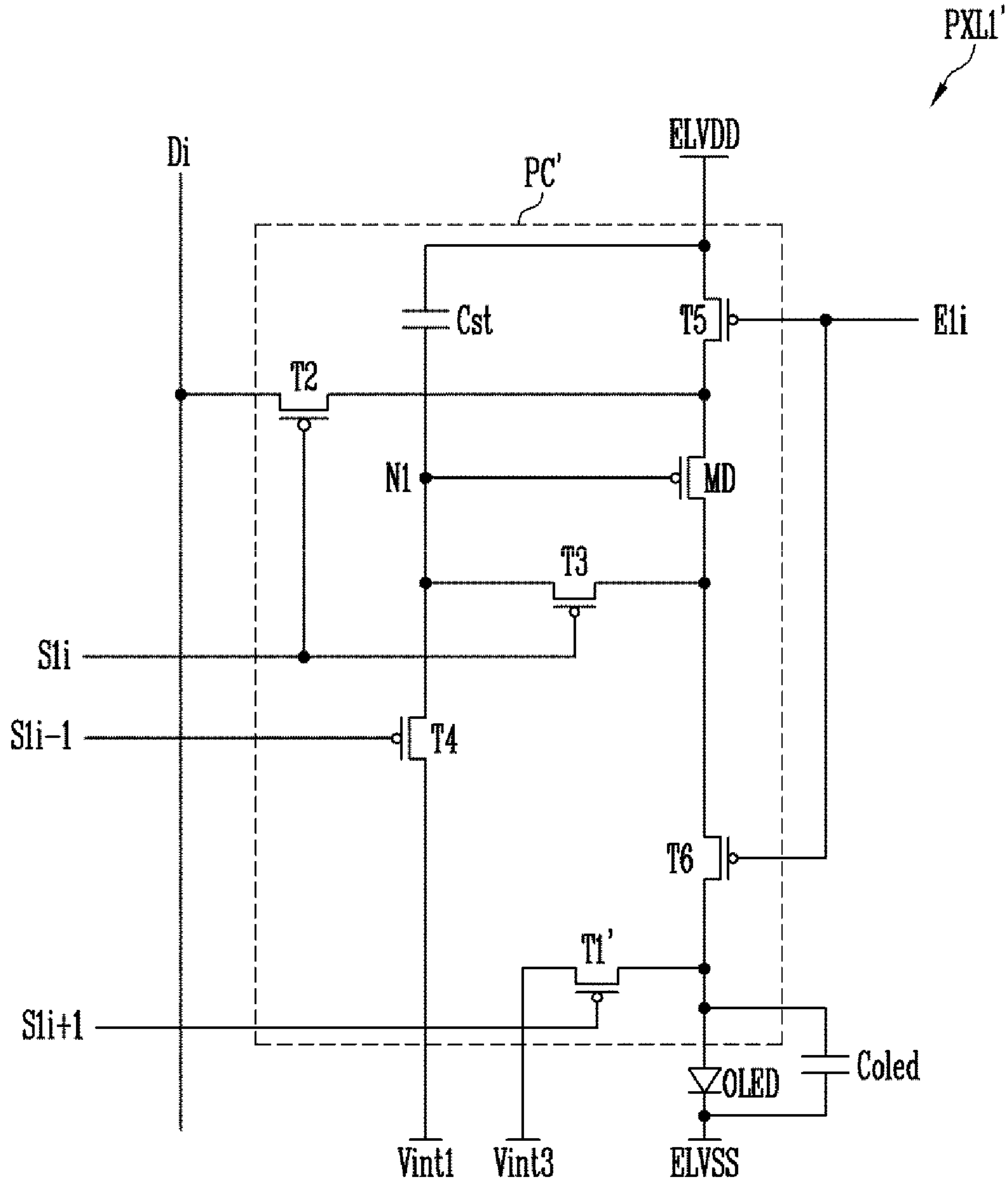
FIG. 18 is a view illustrating an embodiment of one of the first pixels shown in FIG. 17.

FIG. 18 is a view illustrating an embodiment of one of the first pixels shown in FIG. 17. For convenience of description, a first pixel PXL1' coupled to an ith (i is a natural number) data line Di and an ith first scan line S1*i* is illustrated in FIG. 18. In FIG. 18, components that are the same or substantially the same as those of FIG. 13 are designated by like reference numerals, and thus, their detailed descriptions may not be repeated.

Referring to FIG. 18, the first pixel PXL1', according to an embodiment of the present disclosure, includes an organic light emitting diode OLED and a pixel circuit PC' for controlling the amount of current supplied to the organic light emitting diode OLED.

An anode electrode of the organic light emitting diode OLED is coupled to the pixel circuit PC', and a cathode electrode of the organic light emitting diode OLED is coupled to a second power source ELVSS. The organic light emitting diode OLED generates light of a luminance (e.g., a predetermined luminance) corresponding the amount of current supplied from the pixel circuit PC'.

The pixel circuit PC' includes a driving transistor MD, first to sixth transistors T1' to T6, and a storage capacitor Cst.

The first transistor T1' is coupled between the third initialization power source Vint3 and the anode electrode of the organic light emitting diode OLED. In addition, a gate electrode of the first transistor T1' is coupled to an (i+1)th first scan line S1*i*+1. The first transistor T1' is turned on when a scan signal is supplied to the (i+1)th first scan line S1*i*+1 to supply a voltage of the third initialization power source Vint3 to the anode electrode of the organic light emitting diode OLED.

In order to realize high luminance, a voltage of the second power source ELVSS that is coupled to the cathode electrode of the organic light emitting diode OLED may be lowered. When the voltage of the second power source ELVSS is lowered, the amount of current supplied from the pixel circuit PC' to the organic light emitting diode OLED is increased, and accordingly, the organic light emitting diode OLED may have an increased luminance.

Here, when the voltage of the second power source ELVSS is lowered, the voltage of the third initialization power source Vint3 may be lowered. Therefore, when the first initialization power source Vint1 and the third initialization power source Vint3 are not separated from each other, leakage current flowing from the pixel circuit PC' to an initialization power source may be increased as the voltage of the second power source ELVSS is lowered.

On the other hand, when the first initialization power source Vint1 and the third initialization power source Vint3 are separated from each other according to an embodiment of the present disclosure, the voltage of the first initialization power source Vint1 may be set regardless of the voltage of the second power source ELVSS. For example, according to an embodiment of the present disclosure, the first initialization power source Vint1 may have a voltage higher than that of the third initialization power source Vint3, and accordingly, leakage current flowing from the pixel circuit PC' to the first initialization power source Vint1 may be reduced or minimized.

In addition, when the display device is driven in the second mode, the first initialization power source Vint1 may have the first voltage V1, and accordingly, leakage current flowing from a first node N1 to the first initialization power source Vint1 may be reduced or minimized.

Here, when the first initialization power source Vint1 and the third initialization power source Vint3 are not separated from each other, e.g., when the pixel circuit PC is configured as shown in FIG. 13, a leakage current (e.g., a predetermined leakage current) may be supplied from the first initialization power source Vint1 having the first voltage V1 to the anode electrode of the organic light emitting diode OLED via the first transistor T1 during the period in which the display device is driven in the second mode. Then, light may be minutely emitted from the organic light emitting diode OLED by the leakage current during the period in which the display device is driven in the second mode.

On the other hand, when the first initialization power source Vint1 and the third initialization power source Vint3 are separated from each other, leakage current may not be supplied to the organic light emitting diode OLED, even when the first initialization power source Vint1 has the first voltage V1, and accordingly, the display quality of the display device may be improved.

Figure 19:
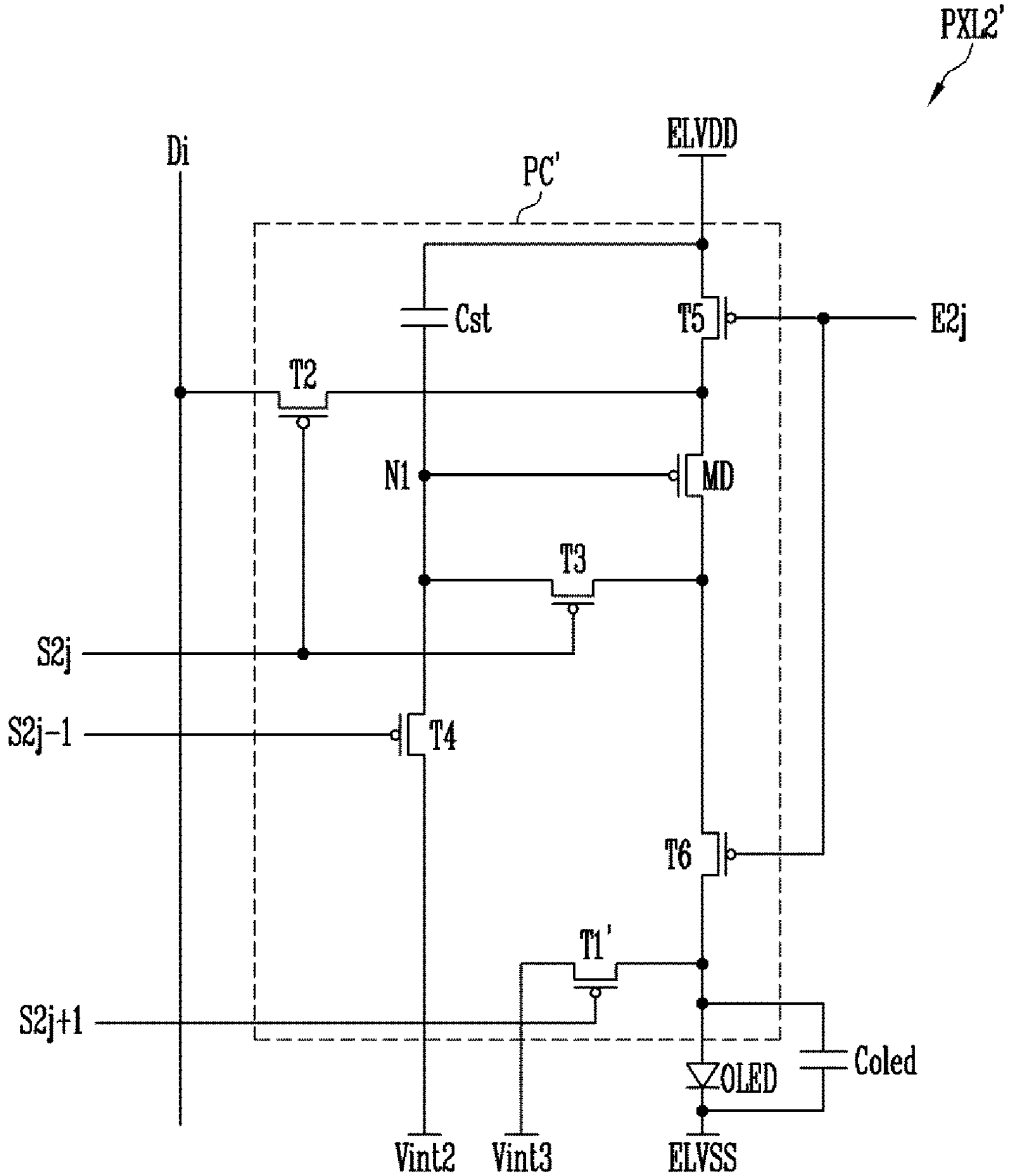
FIG. 19 is a view illustrating an embodiment of one of the second pixels shown in FIG. 17.

Meanwhile, as shown in FIG. 19, the second pixel PXL2' has the same or substantially the same pixel structure as that of the first pixel PXL1'. However, signal lines S2*j*, S2*j*−1, S2*j*+1, and E2*j* coupled to the second pixel PXL2' are changed corresponding to the position of the second pixel PXL2'. In addition, a fourth transistor T4 of the second pixel PXL2' is coupled to the second initialization power source Vint2, and a first transistor T1' of the second pixel PXL2' is coupled to the third initialization power source Vint3.

FIG. 20 is a waveform diagram illustrating an embodiment of a driving method when the first pixel shown in FIG. 18 is driven in the first mode and the second mode. Here, the transistors that are driven using the same or substantially the same driving method as the first pixel of FIG. 13 will be briefly described.

A case where the display device is driven in the first mode will first be described with reference to FIG. 20.

First, an emission control signal is supplied to an ith first emission control line E1*i*, and accordingly, the fifth transistor T5 and the sixth transistor T6 are turned off. When the fifth transistor T5 and the sixth transistor T6 are turned off, the first pixel PXL1' is set to the non-emission state.

After the emission control signal is supplied to the ith first emission control line E1*i*, a scan signal is supplied to an (i−1)th first scan line S1*i*−1. When the scan signal is supplied to the (i−1)th first scan line S1*i*−1, the fourth transistor T4 is turned on, and accordingly, the first node N1 is initialized to the second voltage V2 of the first initialization power source Vint1.

After the scan signal is supplied to the (i−1)th first scan line S1*i*-1, a scan signal is supplied to the ith first scan line S1*i*. When the scan signal is supplied to the ith first scan line S1*i*, the second transistor T2 and the third transistor T3 are turned on.

When the third transistor T3 is turned on, a second electrode of the driving transistor MD and the first node N1 are electrically coupled to each other. When the second transistor T2 is turned on, a data signal from the data line Di is supplied to a first electrode of the driving transistor MD. At this time, the driving transistor MD is turned on, and accordingly, a voltage obtained by subtracting a threshold voltage (e.g., an absolute threshold voltage) of the driving transistor MD from a voltage of the data signal is supplied to the first node N1. At this time, the storage capacitor Cst stores a voltage corresponding to the first node N1.

After a voltage corresponding to the threshold voltage of the driving transistor MD and the data signal is stored in the storage capacitor Cst, a scan signal is supplied to the (i+1)th first scan line S1*i*+1. When the scan signal is supplied to the (i+1)th first scan line S1*i*+1, the first transistor T1' is turned on.

When the first transistor T1' is turned on, the voltage of the third initialization power source Vint3 is supplied to the anode electrode of the organic light emitting diode OLED. Then, an organic capacitor Coled of the organic light emitting diode OLED is discharged.

Afterwards, the supply of the emission control signal to the ith first emission control line E1*i* is stopped. When the supply of the emission control signal to the ith first emission control line E1*i* is stopped, the fifth transistor T5 and the sixth transistor T6 are turned on. At this time, the driving transistor MD controls the amount of current flowing from the first power source ELVDD to the second power source ELVSS via the organic light emitting diode OLED, corresponding to a voltage of the first node N1. Then, the organic light emitting diode OLED generates light of a luminance (e.g., a predetermined luminance) corresponding to the amount of current supplied from the driving transistor MD.

Meanwhile, when the display device is driven in the first mode and the second mode, the second pixel PXL2' is driven using the same or substantially the same method as that of the first pixel PXL1', and therefore, detailed description thereof may not be repeated. However, when the display device is driven in the first mode and the second mode, the second pixel PXL2' generates light of a luminance (e.g., a predetermined luminance), corresponding to the above-described driving method.

A case where the display device is driven in the second mode will be described as follows with reference to FIG. 20.

When the display device is driven in the second mode, the scan signal is not supplied to the first scan line S1*i*−1 or S1*i*. When the scan signal is not supplied to the first scan line S1*i*−1 or S1*i*, the voltage of the first scan line S1*i*−1 or S1*i* is set to the gate-off voltage. Thus, the second transistor T2, the third transistor T3, and the first transistor T1' maintain or substantially maintain the turn-off state during a period in which the display device is driven in the second mode.

The emission control signal is supplied to the first emission control line E1*i* during the period in which the display device is driven in the second mode. That is, the voltage of the first emission control line E1*i* is set to the gate-off voltage during the period in which the display device is driven in the second mode. When the gate-off voltage is supplied to the first emission control line E1*i*, the fifth transistor T5 and the sixth transistor T6 are set to the turn-off state. That is, the first pixels PXL1' are set to the non-emission state during the period in which the display device is driven in the second mode, and accordingly, a black screen (or black image) may be displayed in the first pixel region AA1.

The voltage of the first initialization power source Vint1 has the first voltage V1 higher than the second voltage V2 during the period in which the display device is driven in the second mode. When the first initialization power source Vint1 has the first voltage V1, a leakage current I supplied from the first node N1 to the first initialization power source Vint1 may be reduced or minimized. Then, characteristics of the driving transistor MD may not be changed during the period in which the display device is driven in the second mode, and accordingly, it may be possible to prevent or substantially prevent a difference in luminance between the first pixel region and the second pixel region.

Figure 21:
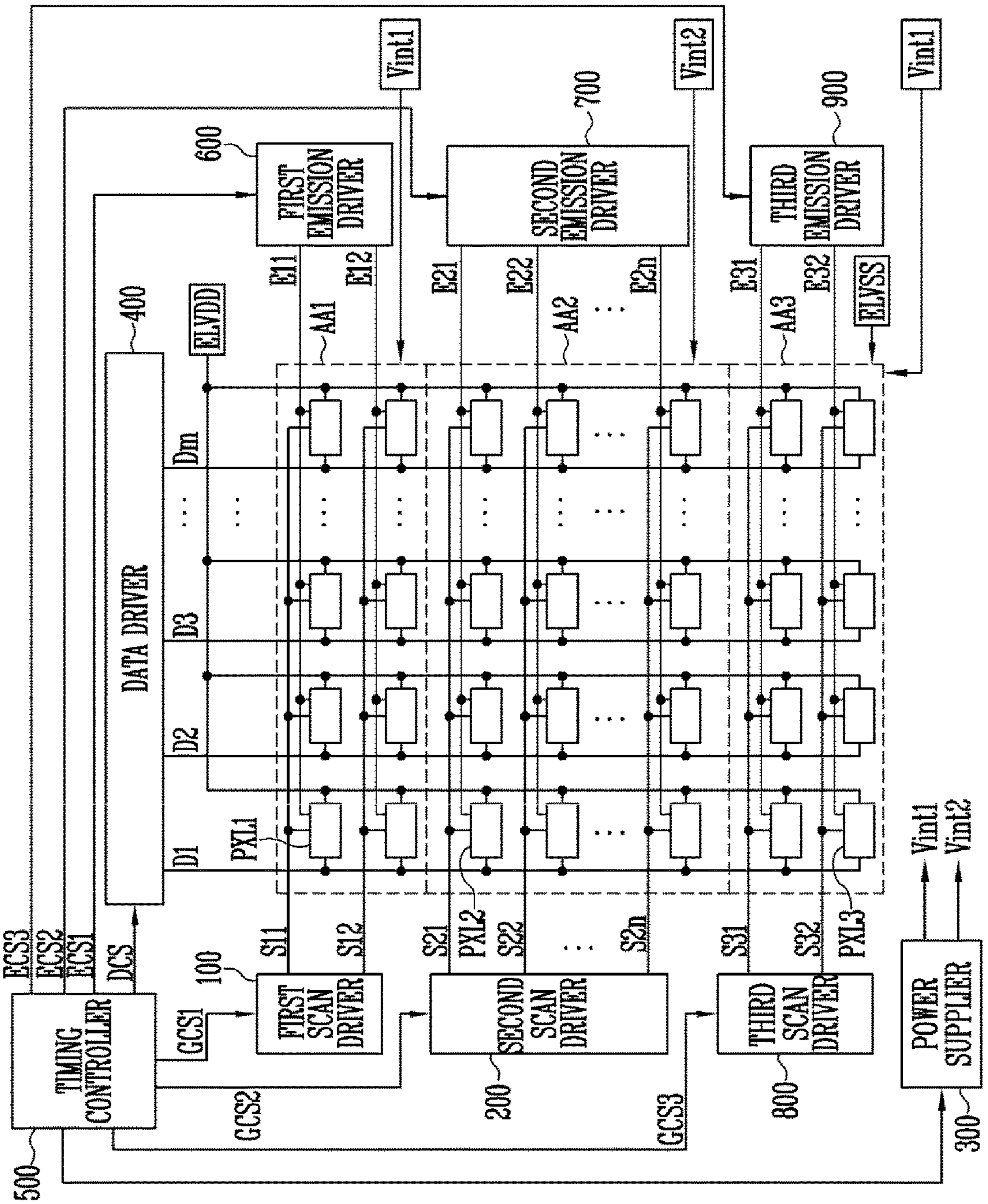
FIG. 21 is a view illustrating an embodiment of the display device corresponding to FIG. 7.

FIG. 21 is a view illustrating an embodiment of the display device corresponding to FIG. 7. In FIG. 21, components that are the same or substantially the same as those of FIG. 12 are designated by like reference numerals, and thus, their detailed descriptions may not be repeated.

Referring to FIG. 21, the display device, according to an embodiment of the present disclosure, includes a first scan driver 100, a second scan driver 200, a third scan driver 800, a power supplier 300, a data driver 400, a timing controller 500, a first emission driver 600, a second emission driver 700, and a third emission driver 900.

A pixel region is divided into a first pixel region AA1, a second pixel region AA2, and a third pixel region AA3. The first pixel region AA1 includes first pixels PXL1, and the second pixel region AA2 includes second pixels PXL2. In addition, the third pixel region AA3 includes third pixels PXL3.

The third pixels PXL3 are coupled to third scan lines S31 and S32, third emission control lines E31 and E32, and data lines D1 to Dm. The third pixels PXL3 are selected when a scan signal is supplied to the third scan lines S31 and S32, to receive a data signal supplied from the data lines D1 to Dm. The third pixels PXL3 when receiving the data signal generate light of a luminance (e.g., a predetermined luminance) corresponding to the data signal. Here, the emission time of the third pixels PXL3 is controlled by an emission control signal supplied from the third light emitting control lines E31 and E32. In each of the third pixels PXL3, a gate electrode of a driving transistor is initialized to a voltage of a first initialization power source Vint1 before the data signal is supplied.

While a case where two third scan lines S31 and S32 and two third emission control lines E31 and E32 are provided in the third pixel region AA3 is illustrated in FIG. 21, the present disclosure is not limited thereto. For example, two or more third scan lines S31 and S32 and two or more third emission control lines E31 and E32 may be provided in the third pixel region AA3. In addition, one or more dummy scan lines and one or more dummy emission control lines may be additionally provided in the third pixel region AA3, corresponding to a circuit structure of the third pixel PXL3.

The power supplier 300 generates the first initialization power source Vint1 and a second initialization power source Vint2, corresponding to a mode signal of the timing controller 500. The mode signal may be a signal corresponding to the first mode or the second mode.

The first initialization power source Vint1 generated by the power supplier 300 is supplied to the first pixels PXL1 and the third pixels PXL3 via a first power line 60'. In addition, the second initialization power source Vint2 generated by the power supplier 300 is supplied to the second pixels PXL2 via a second power line 70'.

As shown in FIG. 15, the power supplier 300 generates the same or substantially the same voltage, e.g., the first initialization power source Vint1 and the second initialization power source Vint2, which have a second voltage V2, when the display device is driven in the first mode. Also, the power supplier 300 generates the second initialization power source Vint2 to have the second voltage V2, and generates the first initialization power source Vint1 to have a first voltage V1, when the display device is driven in the second mode.

The third scan driver 800 supplies a scan signal to the third scan lines S31 and S32, corresponding to a third gate control signal GCS3 from the timing controller 500. For example, the third scan driver 800 may sequentially supply the scan signal to the third scan lines S31 and S32. When the scan signal is sequentially supplied to the third scan lines S31 and S32, the third pixels PXL3 are sequentially selected in units of horizontal lines. To this end, the scan signal may have the gate-on voltage, such that transistors included in the third pixels PXL3 may be turned on.

Meanwhile, when the display device is driven in the first mode, the third scan driver 800 supplies the scan signal to the third scan lines S31 and S32. When the display device is driven in the second mode, the third scan driver 800 does not supply the scan signal to the third scan lines S31 and S32. Thus, when the display device is driven in the second mode, the third scan lines S31 and S32 are set to the gate-off voltage.

The third emission driver 900 receives a third emission control signal ECS3 supplied from the timing controller 500. The third emission driver 900 when receiving the third emission control signal ECS3 supplies an emission control signal to the third emission control lines E31 and E32. For example, the third emission driver 900 may sequentially supply the emission control signal to the third emission control lines E31 and E32. The emission control signal is used to control the emission time of the third pixel PXL3. To this end, the emission control signal may have the gate-off voltage, such that transistors included in the third pixel PXL3 may be turned off.

Meanwhile, when the display device is driven in the first mode, the third emission driver 900 sequentially supplies the emission control signal to the third emission control lines E31 and E32. In addition, when the display device is driven in the second mode, the third emission driver 900 supplies the emission control signal to the third emission control lines E31 and E32 during a frame period. Thus, when the display device is driven in the second mode, the third emission control lines E31 and E32 are set to the gate-off voltage, and accordingly, the third pixels PXL3 are set to the non-emission state.

The timing controller 500 generates a first gate control signal GCS1, a second gate control signal GCS2, the third gate control signal GCS3, a first emission control signal ECS1, a second emission control signal ECS2, a third emission control signal ECS3, and a data control signal DCS, based on timing signals supplied from the outside. Also, the timing controller 500 supplies the mode signal to the power supplier 300.

The third gate control signal GCS3 generated by the timing controller 500 is supplied to the third scan driver 800, and the third emission control signal ECS3 is supplied to the third emission driver 900.

The third gate control signal GCS3 includes a start signal and clock signals. The start signal controls the supply timing of scan signals. The clock signals are used to shift the start signal.

The third emission control signal ECS3 includes an emission start signal and clock signals. The emission start signal controls the supply timing of emission control signals. The clock signals are used to shift the emission start signal.

Meanwhile, an operation process of the third pixels PXL3 is the same or substantially the same as that of the first pixels PXL1. For example, the third pixels PXL3 included in the third pixel region AA3 may have the same or substantially the same circuit structure as the first pixels PXL1 included in the first pixel region AA1. In addition, when the display device is driven in the first mode, the third pixels PXL3 display an image (e.g., a predetermined image). When the display device is driven in the second mode, the third pixels PXL3 are set to the non-emission state. In addition, the first initialization power source Vint1 has the first voltage V1 during a period in which the display device is driven in the second mode, and accordingly, leakage current supplied from the third pixels PXL3 to the first initialization power source Vint1 is reduced or minimized. In this case, it is possible to reduce or prevent a difference in luminance between the second pixel region AA2 and the third pixel region AA3, corresponding to the mode of the display device.

Figure 22:
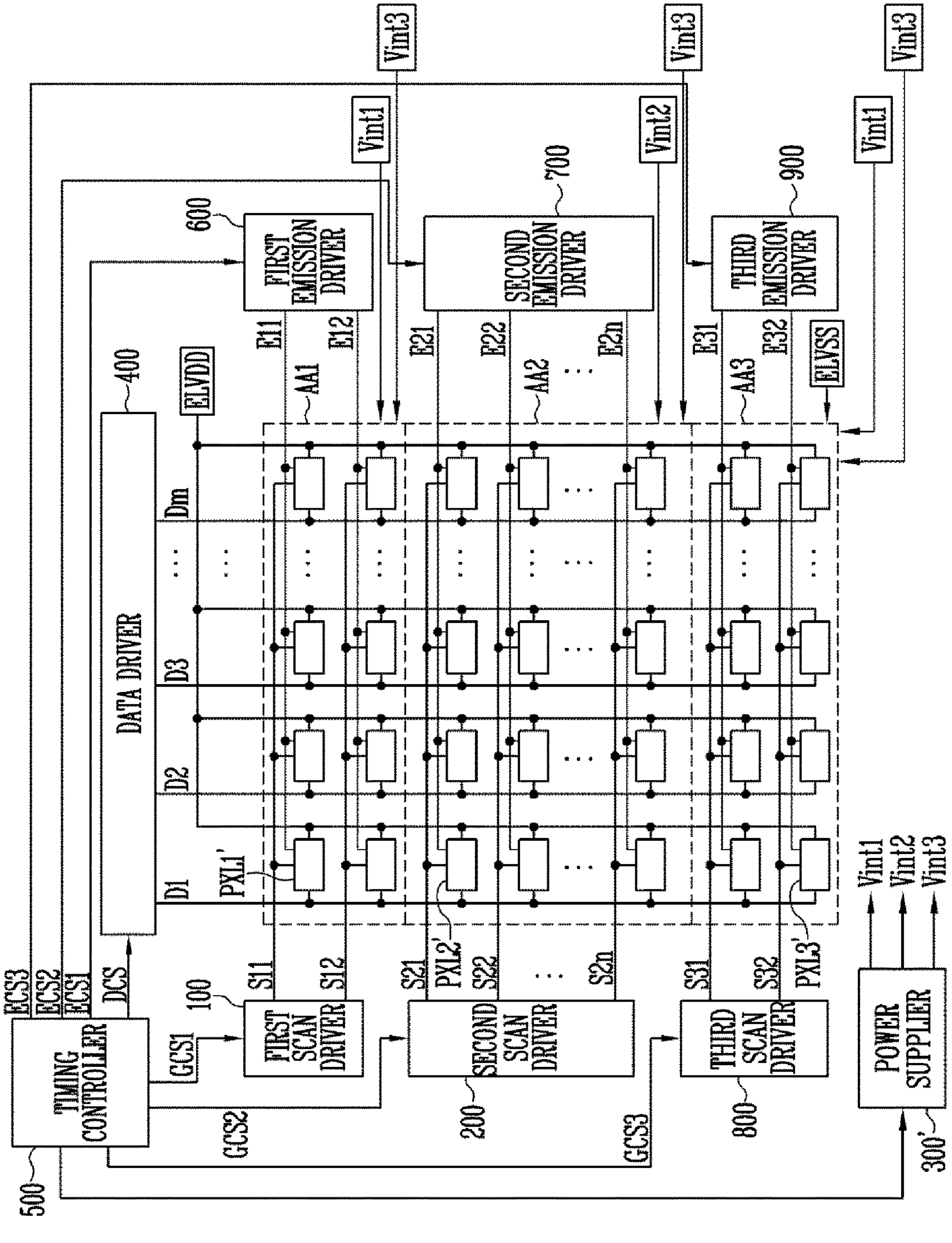
FIG. 22 is a view illustrating another embodiment of the display device corresponding to FIG. 7.

FIG. 22 is a view illustrating another embodiment of the display device corresponding to FIG. 7. In FIG. 22, components that are the same or substantial the same as those of FIGS. 17 and 21 are designated by like reference numerals, and thus, their detailed descriptions may not be repeated.

Referring to FIG. 22, the display device, according to an embodiment of the present disclosure, includes a first scan driver 100, a second scan driver 200, a third scan driver 800, a power supplier 300', a data driver 400, a timing controller 500, a first emission driver 600, a second emission driver 700, and a third emission driver 900.

A pixel region is divided into a first pixel region AA1, a second pixel region AA2, and a third pixel region AA3. The first pixel region AA1 includes first pixels PXL1', and the second pixel region AA2 includes second pixels PXL2'. Further, the third pixel region AA3 includes third pixels PXL3'.

The third pixels PXL3' are coupled to third scan lines S31, S32, third emission control lines E31 and E32, and data lines D1 to Dm. A gate electrode of a driving transistor included in each of the third pixels PXL3' is initialized to a voltage of a first initialization power source Vint1 before a data signal is supplied. In addition, an anode electrode of an organic light emitting diode included in each of the third pixels PXL3' is initialized to a voltage of a third initialization power source Vint3.

The power supplier 300' generates the first initialization power source Vint1, a second initialization power source Vint2, and a third initialization power source Vint3, corresponding to a mode signal of the timing controller 500.

The first initialization power source Vint1 generated by the power supplier 300' is supplied to each of the first pixels PXL1' and the third pixels PXL3' via a first power line 60', and the second initialization power source Vint2 generated by the power supplier 300' is supplied to the second pixels PXL2' via a second power line 70'. In addition, the third initialization power source Vint3 generated by the power supplier 300' is supplied to each of the first pixels PXL1', the second pixels PXL2', and the third pixels PXL3' via a third power line 80'.

As shown in FIG. 20, the power supplier 300' generates the same or substantially the same voltage, e.g., the first initialization power source Vint1 and the second initialization power source Vint2, which each have a second voltage V2, when the display device is driven in the first mode. Also, the power supplier 300' generates the second initialization power source Vint2 to have the second voltage V2, and generates the first initialization power source Vint1 to have a first voltage V1, when the display device is driven in the second mode. Here, the first voltage V1 has a voltage higher than the second voltage V2, and accordingly, leakage current from the first pixels PXL1' and the third pixels PXL3' may be reduced or minimized during a period in which the display device is driven in the second mode.

In addition, the power supplier 300' generates the third initialization power source Vint3 to have a third voltage V3, corresponding to the first and second modes. Here, the third voltage V3 may have a voltage lower than the second voltage V2.

While a case where the voltage of the first initialization power source Vint1 has the first voltage V1 during the period in which the display device is driven in the second mode is illustrated in FIGS. 15 and 20, the present disclosure is not limited thereto.

Figure 23:
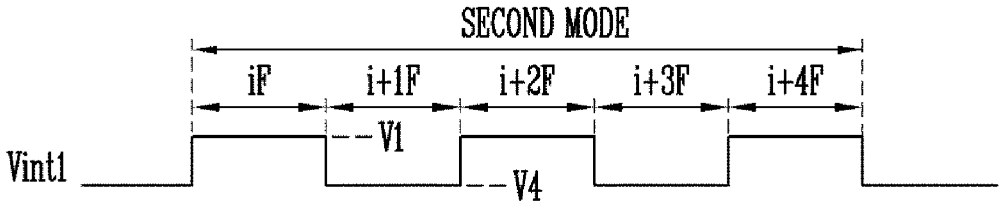
FIG. 23 is a view illustrating an embodiment of a first initialization power source supplied during a second mode period.

For example, the voltage of the first initialization power source Vint1, as shown in FIG. 23, may repeatedly transition from the first voltage V1 and a fourth voltage V4 in units of frames during the period in which the display device is driven in the second mode.

Here, the fourth voltage V4 has a voltage lower than the first voltage V1. For example, the fourth voltage V4 may have the same or substantially the same voltage as the second voltage V2. When the first initialization power source Vint1 is varied in units of frames, a constant or substantially constant voltage is applied to the gate electrode of the driving transistor. In other words, it may be possible to prevent or substantially prevent characteristics of the driving transistor from being changed as a constant or substantially constant voltage is applied to the gate electrode of the driving transistor for a long period of time.

In the display device and the driving method thereof according to one or more embodiments of the present disclosure, a driving transistor included in each pixel is initialized by a voltage of an initialization power source. Here, when the display device is not mounted on a wearable device, the same or substantially the same initialization power source is supplied to the entire region (e.g., display region) of the display device, and accordingly, an image of a uniform luminance may be displayed.

Further, when the display device is mounted on a wearable device, an initialization power source having a low voltage is supplied to a second pixel region in which an image is displayed, and an initialization power source having a high voltage is supplied to a first pixel region in which the image is not displayed. When the initialization power source having the high voltage is supplied to the first pixel region, characteristics of the driving transistor may be prevented or substantially prevented from being changed by leakage current, and accordingly, it may be possible to reduce or prevent a difference in luminance between the first pixel region and the second pixel region.

Example embodiments have been disclosed herein, and although specific terms are employed, they are used and are to be interpreted in a generic and descriptive sense only and not for purposes of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments, unless otherwise specifically indicated. Accordingly, it will be understood by those of skill in the art that various changes in form and details may be made without departing from the spirit and scope of the present disclosure as set forth in the following claims, and their equivalents.

What is claimed is:

1. A display device comprising:

a first pixel region comprising first pixels, each of the first pixels comprising a driving transistor configured to be initialized by a first initialization power source supplied from a first power line;

a second pixel region comprising second pixels, each of the second pixels comprising a driving transistor configured to be initialized by a second initialization power source supplied from a second power line; and a power supplier configured to supply the first initialization power source and the second initialization power source, the first initialization power source having a same voltage level as that of the second initialization power source when the display device is driven in a first mode, and the first initialization power source having a different voltage level from that of the second initialization power source during at least one frame period when the display device is driven in a second mode, wherein the display device is configured to be driven in the second mode when the display device is mounted on a wearable device, and the display device is configured to be driven in the first mode otherwise.

2. The display device of claim 1, wherein the power supplier is configured to supply each of the first initialization power source and the second initialization power source, each having a second voltage, when the display device is driven in the first mode.

3. The display device of claim 1, wherein the power supplier is configured to:

supply the second initialization power source having a second voltage, when the display device is driven in the second mode;

supply the first initialization power source having a first voltage that is higher than the second voltage during a first frame period, when the display device is driven in the second mode; and supply the first initialization power source having a fourth voltage that is lower than the second voltage during a second frame period adjacent to the first frame period, when the display device is driven in the second mode.

4. The display device of claim 3, wherein the fourth voltage has a same voltage level as that of the second voltage.

5. The display device of claim 1, wherein the first power line and the second power line are at one side of the first pixel region and the second pixel region.

6. The display device of claim 1, wherein the first power line and the second power line are each at two opposite sides of the first pixel region and the second pixel region.

7. The display device of claim 1, wherein each of the first pixels and the second pixels further comprises:

an organic light emitting diode, and the driving transistor is configured to control an amount of current supplied to the organic light emitting diode, and wherein the power supplier is configured to supply the first initialization power source and/or the second initialization power source before a data signal is supplied to a gate electrode of the driving transistor.

8. The display device of claim 7, wherein a voltage of the first initialization power source is to be supplied to an anode electrode of the organic light emitting diode of each of the first pixels before the organic light emitting diode emits light, and wherein a voltage of the second initialization power source is to be supplied to an anode electrode of the organic light emitting diode of each of the second pixels before the organic light emitting diode emits light.

9. The display device of claim 7, wherein a voltage of a third initialization power source is to be supplied to an anode electrode of the organic light emitting diode of each of the first pixels and the second pixels via a third power line before the organic light emitting diode emits light.

10. The display device of claim 9, wherein the third initialization power source has a voltage level different from each of the first initialization power source and the second initialization power source.

11. The display device of claim 9, wherein the third initialization power source has a voltage level lower than each of the first initialization power source and the second initialization power source.

12. The display device of claim 9, wherein the power supplier is configured to supply the third initialization power source having the same voltage level when the display device is driven in the first mode and the second mode.

13. The display device of claim 9, wherein the third power line is at one side of the first pixel region and the second pixel region.

14. The display device of claim 9, wherein the third power line is at two opposite sides of each of the first pixel region and the second pixel region.

15. The display device of claim 1, further comprising:

a first scan driver configured to drive first scan lines coupled to the first pixels;

a first emission driver configured to drive first emission control lines coupled to the first pixels;

a second scan driver configured to drive second scan lines coupled to the second pixels; and a second emission driver configured to drive second emission control lines coupled to the second pixels.

16. The display device of claim 15, wherein the first scan driver is configured to supply a scan signal to the first scan lines, and the first emission driver is configured to supply an emission control signal to the first emission control lines such that the first pixels emit light corresponding to a data signal, when the display device is driven in the first mode.

17. The display device of claim 15, wherein the first scan driver is configured to supply a gate-off voltage to the first scan lines, and the first emission driver is configured to supply a gate-off voltage to the first emission control lines, when the display device is driven in the second mode.

18. The display device of claim 15, wherein the second scan driver is configured to supply a scan signal to the second scan lines, and the second emission driver is configured to supply an emission control signal to the second emission control lines such that the second pixels emit light corresponding to a data signal, when the display device is driven in each of the first mode and the second mode.

19. The display device of claim 1, further comprising a third pixel region comprising third pixels, each of the third pixels comprising a driving transistor configured to be initialized by the first initialization power source.

20. The display device of claim 19, wherein the first initialization power source is to be supplied to the third pixels via the first power line.

21. The display device of claim 19, wherein the first initialization power source is to be supplied to the third pixels via a fourth power line different from the first power line.

22. The display device of claim 19, wherein the second pixel region is between the first pixel region and the third pixel region.

23. The display device of claim 19, wherein each of the first pixels, the second pixels, and the third pixels comprises:

an organic light emitting diode, and the driving transistor is configured to control an amount of current supplied to the organic light emitting diode, and wherein the power supplier is configured to supply the first initialization power source and/or the second initialization power source to a gate electrode of the driving transistor before a data signal is supplied.

24. The display device of claim 23, wherein a voltage of the first initialization power source is to be supplied to an anode electrode of the organic light emitting diode of each of the first pixels and the third pixels before the organic light emitting diode emits light, and wherein a voltage of the second initialization power source is to be supplied to an anode electrode of the organic light emitting diode of each of the second pixels before the organic light emitting diode emits light.

25. The display device of claim 23, wherein a voltage of a third initialization power source is to be supplied to an anode electrode of the organic light emitting diode of each of the first pixels, the second pixels, and the third pixels via a third power line before the organic light emitting diode emits light.

26. The display device of claim 25, wherein the third initialization power source has a voltage level different from each of the first initialization power source and the second initialization power source.

27. The display device of claim 25, wherein the power supplier is configured to supply the third initialization power source having the same voltage level when the display device is driven in each of the first mode and the second mode.

28. A method for driving a display device, the method comprising:

supplying initialization power sources having a same voltage level to first pixels included in a first pixel region and second pixels included in a second pixel region, when the display device is driven in a first mode; and supplying the initialization power sources having different voltage levels to the first pixels and the second pixels, when the display device is driven in a second mode, wherein the display device is driven in the second mode when the display device is mounted on a wearable device, and the display device is driven in the first mode otherwise.

29. The method of claim 28, further comprising supplying a corresponding one of the initialization power sources to an anode electrode of an organic light emitting diode of each of the first pixels and the second pixels, when the display device is driven in the first mode and the second mode.

30. The method of claim 29, wherein a voltage of the corresponding initialization power source has a voltage level different from that of each of other ones of the initialization power sources.

31. The method of claim 30, wherein the voltage level of the corresponding initialization power source is lower than that of each of the other initialization power sources.

32. The method of claim 28, wherein the first pixels are supplied with a corresponding one of the initialization power sources having a first voltage when the display device is driven in the second mode, and the first pixels are supplied with the corresponding one of the initialization power sources having a second voltage lower than the first voltage when the display device is driven in the first mode.

* * * * *